(12) United States Patent
Watanabe

(10) Patent No.: US 12,203,009 B2
(45) Date of Patent: Jan. 21, 2025

(54) ADHESIVE TAPE

(71) Applicant: DIC Corporation, Tokyo (JP)

(72) Inventor: Daisuke Watanabe, Kitaadachi-gun (JP)

(73) Assignee: DIC CORPORATION, Tokyo (JP)

(*) Notice: Subject to any disclaimer, the term of this patent is extended or adjusted under 35 U.S.C. 154(b) by 129 days.

(21) Appl. No.: 17/629,902

(22) PCT Filed: Aug. 27, 2020

(86) PCT No.: PCT/JP2020/032267
§ 371 (c)(1),
(2) Date: Jan. 25, 2022

(87) PCT Pub. No.: WO2021/039878
PCT Pub. Date: Mar. 4, 2021

(65) Prior Publication Data
US 2022/0251428 A1 Aug. 11, 2022

(30) Foreign Application Priority Data
Aug. 30, 2019 (JP) .................................. 2019-159017

(51) Int. Cl.
*C09J 11/08* (2006.01)
*C08K 3/22* (2006.01)
*C08K 9/06* (2006.01)
*C09J 11/04* (2006.01)
*C09J 133/08* (2006.01)

(52) U.S. Cl.
CPC ................. *C09J 11/08* (2013.01); *C08K 3/22* (2013.01); *C08K 9/06* (2013.01); *C09J 11/04* (2013.01); *C09J 133/08* (2013.01); *C08K 2003/2227* (2013.01); *C08K 2201/003* (2013.01); *C09J 2301/122* (2020.08); *C09J 2301/124* (2020.08); *C09J 2301/312* (2020.08); *C09J 2301/408* (2020.08); *C09J 2301/502* (2020.08); *C09J 2433/00* (2013.01); *C09J 2483/00* (2013.01)

(58) Field of Classification Search
None
See application file for complete search history.

(56) References Cited

U.S. PATENT DOCUMENTS

| | | |
|---|---|---|
| 6,680,096 B1 | 1/2004 | Luhmann et al. |
| 2007/0267133 A1 | 11/2007 | Matano et al. |
| 2020/0190370 A1 | 6/2020 | Watanabe et al. |
| 2022/0251428 A1 | 8/2022 | Watanabe |

FOREIGN PATENT DOCUMENTS

| | | | |
|---|---|---|---|
| JP | 2001-89726 A | | 4/2001 |
| JP | 2002-105217 A | | 4/2002 |
| JP | 2007-332341 A | | 12/2007 |
| JP | 2009-132803 A | | 6/2009 |
| JP | 2017171772 A | * | 9/2017 |
| JP | 2017-226757 A | | 12/2017 |
| JP | 7099641 B2 | | 7/2022 |
| JP | 7228108 B2 | | 2/2023 |
| WO | 2019/003933 A1 | | 1/2019 |

OTHER PUBLICATIONS

Musashijima et al., JP 2017171772, Sep. 28, 2017 (machine translation) (Year: 2017).*
International Search Report dated Nov. 10, 2020, issued in counterpart International Application No. PCT/JP2020/032267 (3 pages).

* cited by examiner

*Primary Examiner* — Cheng Yuan Huang
(74) *Attorney, Agent, or Firm* — WHDA, LLP

(57) ABSTRACT

The adhesive tape has excellent drop impact resistance. It can be removed more easily and more rapidly from an adherend in addition to the excellent drop impact resistance. The adhesive tape includes an adhesive layer, the adhesive layer contains particles having an average particle diameter of 4 to 40 μm and a surface of which is a silicone resin, and an adhesive resin, and the particles has a content of 3 to 50 parts by mass with respect to 100 parts by mass of the adhesive resin. In addition, the adhesive tape of the present invention includes the adhesive layers on one side or both sides of a base material layer, and the base material layer has a thickness of 10 to 500 μm, a breaking strength of 10 to 90 MPa, and a breaking elongation of 400 to 1,500%.

19 Claims, 2 Drawing Sheets

ADHESIVE TAPE

TECHNICAL FIELD

The present invention relates to an adhesive tape.

BACKGROUND ART

Since an adhesive tape has excellent workability and high adhesive reliability, it is widely used as a joining means in various industrial fields such as OA equipment, IT or home appliances, and automobiles for fixing parts, temporarily fixing parts, labels displaying product information, and the like (for example, PTL 1).

CITATION LIST

Patent Literature

PTL 1: JP-A-2001-89726

SUMMARY OF INVENTION

Technical Problem

A product in which a pair of adherends are joined and fixed via an adhesive tape, if dropped during handling, the adherend will be peeled off from the adhesive tape due to the drop impact and disassembled, and it will not be possible to maintain strong fixation. Therefore, the adhesive tape for fixed use is required to have high drop impact resistance, which is unlikely to be peeled off or broken by the impact at the time of dropping, in order to prevent disassembling of the product using the adhesive tape at the time of dropping.

On the other hand, in recent years, from the viewpoint of environmental protection, there is an increasing demand for recycling and reuse of used products or products to be discarded in various industrial fields such as home appliances and automobiles. In a case of recycling and reusing various products, the product needs to be disassembled and each part in the product needs to be removed. In a case of removing each part, it is necessary to perform an operation of peeling an adhesive tape used for fixing parts and labels off. In recent years, a means for recycling and reusing an adhesive tape by grasping and elongating the tip of the adhesive tape to remove the adhesive tape and disassembling the adhesive tape has been proposed. However, in recent years, adhesive tapes have been provided in various places in the product, and the operation of peeling the adhesive tapes off has become complicated. In addition, in a product in which a large number of parts are mounted at a high density, in order to remove one part from the dense parts, it was necessary to peel the adhesive tape off by pulling it from an attachment surface in a direction of a high angle (for example, 60° or more), but in a case of pulling it at a high angle as described above, a load was applied to the adhesive tape, and particularly, in a case of attempting to more rapidly elongate the adhesive tape, the adhesive tape was torn off in some cases.

Therefore, in a step of removing the adhesive tape, it is desired to reduce work cost by making it possible to remove the adhesive tape more easily and more rapidly. For this reason, the adhesive tape for fixing purposes is required to have the high drop impact resistance, and to be able to be easily and more rapidly removed when disassembling the product.

Therefore, the present invention has been made in view of the problems, and a first object of the present invention is to provide an adhesive tape having excellent drop impact resistance. In addition, a second object of the present invention is to provide an adhesive tape that can be more easily and more rapidly removed from an adherend in addition to being excellent in drop impact resistance.

Solution to Problem

In order to achieve the first object, the present invention provides the following adhesive tape.

[1] An adhesive tape including an adhesive layer, in which the adhesive layer contains particles having an average particle diameter of 4 to 40 μm and a surface of which is a silicone resin, and an adhesive resin, and the particles has a content of 3 to 50 parts by mass with respect to 100 parts by mass of the adhesive resin.

[2] The adhesive tape according to [1], in which, in a case where particle diameters of particles corresponding to cumulative percentages of 10% and 90% in a cumulative particle size distribution of the particles are defined as D10 and D90, respectively, a ratio of the particle diameter D90 to the particle diameter D10 (D90/D10) is 2.5 to 20.

[3] The adhesive tape according to any one of [1] and [2], further including an adhesive layer on one side or both sides of a base material layer.

In addition, in order to achieve the second object, the present invention provides the following adhesive tape.

[4] The adhesive tape according to [3], in which the base material layer has a thickness of 10 to 500 μm, a breaking strength of 10 to 90 MPa, and a breaking elongation of 400% to 1,500%.

[5] The adhesive tape according to [5], in which the base material layer has a rubber hardness of 20 to 90 A.

Advantageous Effects of Invention

The present invention can provide an adhesive tape having excellent drop impact resistance by having a predetermined adhesive layer.

In addition, in the present invention, by providing the predetermined adhesive layer on one surface or both surfaces of the predetermined base material layer, it is possible to provide an adhesive tape that can be more easily and rapidly removed from an adherend in addition to being excellent in drop impact resistance.

DESCRIPTION OF EMBODIMENTS

Figure 1A:
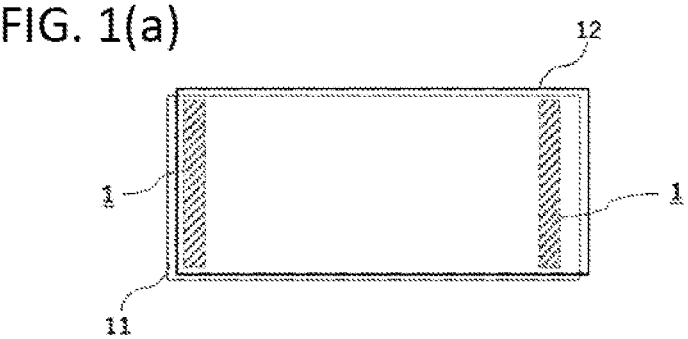
FIG. 1(a) and FIG. 1(b) are a schematic explanatory diagram illustrating a method for evaluating drop impact resistance.

Hereinafter, embodiments of the present invention (hereinafter referred to as "the present embodiments") will be described in detail, but the present invention is not limited to the present embodiments.

In the present specification, the "drop impact resistance" of the adhesive tape means that the adhesive tape is not easily peeled off or broken by the impact (surface impact) received when the product itself using the adhesive tape is dropped. In addition, the "impact resistance" means that the adhesive tape is not easily peeled off or broken by the impact (point impact) received when another product such as a falling object is collided with the product using the adhesive tape that is in a stationary state. Since a method of applying impact stress to the adhesive tape is different, the "drop impact resistance" and the "impact resistance" are used separately in this specification.

"Adhesive Tape"

The adhesive tape of the present embodiment has a first aspect including at least a specific adhesive layer, and a second aspect in which the specific adhesive layer in the first aspect is provided on one or both surfaces of a specific base material layer.

The first aspect of the adhesive tape of the present embodiment includes an adhesive layer, and the adhesive layer contains particles having an average particle diameter of 4 to 40 μm and a surface of which is a silicone resin, and an adhesive resin, and the particles has a content of 3 to 50 parts by mass with respect to 100 parts by mass of the adhesive resin.

In the adhesive tape of the first aspect, since the adhesive layer contains the predetermined content of the particles having the average particle diameter in the predetermined range and the surface of which is the silicone resin, with respect to the adhesive resin, the particles the surface of which is the silicone resin in the adhesive layer can suppress aggregation of particles and can be dispersed in the adhesive resin in an excellent manner. In a case where a stress (drop impact force) due to a drop impact is applied to the adhesive tape of the present embodiment, the adhesive layer forms a cavity at an interface between the adhesive resin and the silicone resin, the stress is alleviated by the cavity, and accordingly, the adhesive tape can exhibit excellent drop impact resistance. Therefore, even if a product in which a pair of adherends are joined to each other with the adhesive tape of the present embodiment interposed therebetween receives the drop impact, the stress is alleviated by the adhesive tape, so that the adherend is less likely to be peeled off from the adhesive tape, it is possible to maintain a strong join between the adherends, and it is possible to prevent damage and disassembly due to the receiving of the drop impact.

In addition, the second aspect of the adhesive tape of the present embodiment is an adhesive tape including a base material layer, and an adhesive layer on one or both surfaces of the base material layer. The base material layer of the adhesive tape of the second aspect has a thickness of 10 to 500 μm, a breaking strength of 10 to 90 MPa, and a breaking elongation of 400% to 1,500%. Further, the adhesive layer of the adhesive tape of the second aspect contains particles having an average particle diameter of 4 to 40 μm and a surface of which is a silicone resin, and an adhesive resin, and the particles has a content of 3 to 50 parts by mass with respect to 100 parts by mass of the adhesive resin. That is, the adhesive layer of the adhesive tape of the second aspect is the same as the adhesive layer of the adhesive tape of the first aspect.

By having such a configuration, the adhesive tape of the second aspect not only has excellent drop impact resistance, but can be more easily and more rapidly removed from the adherend (object to which the adhesive tape is attached).

Specifically, since the base material layer of the adhesive tape of the second aspect has the breaking strength of 10 to 90 MPa and the breaking elongation of 400% to 1, 500%, even in a case where the adhesive tape is pulled from the adherend to peel it off, it is possible to peel the adhesive tape off from the adherend without being torn (it is possible to re-peel). In addition, since the base material layer of the adhesive tape of the second aspect has a thickness of 10 to 500 μm, it is possible to ensure a strength of the adhesive tape and ease of pulling of the adhesive tape. In addition, by satisfying the physical properties of the base material layer, the base material layer can alleviate the impact due to dropping even in the base material layer, in addition to the alleviating effect of the drop impact due to the adhesive layer, and accordingly, the drop impact resistance of the adhesive tape is further improved.

Further, since the adhesive layer of the adhesive tape of the second aspect contains the particles having an average particle diameter of 4 to 40 μm and a surface of which is a silicone resin, and the adhesive resin, and the content of the particles is 3 to 50 parts by mass with respect to 100 parts by mass of the adhesive resin, due to the same reason as for the adhesive layer of the adhesive tape of the first aspect, by combining with the base material layer having the characteristics in addition to excellent drop impact resistance, when the adhesive tape is pulled by the adhesive layer to peel the adhesive tape off from the adherend, the particles the surface of which is the silicone resin are exposed from the adhesive layer which is thinned due to the elongation of the adhesive tape, and friction resistance decreases due to the particles interposed between the adhesive surfaces, and therefore, it is possible to effectively decrease adhesive strength to the adherend by the adhesive layer and easily peel of the adhesive tape off. On the other hand, in a case where the adhesive composition contains a filler and the like, the adhesive performance may be reduced due to the filler or the like. However, since the particles have excellent dispersibility in the adhesive composition, a decrease in adhesive performance due to adding the particles is suppressed and it is possible to ensure the adhesive strength of the adhesive tape.

Therefore, according to the adhesive tape of the second aspect, the adhesive tape has excellent drop impact resistance, and when disassembling the product in which the adherend is attached to the adhesive tape, it is possible to more easily and more rapidly remove the adhesive tape from the adherend.

<Base Material Layer>

In the present embodiment, the adhesive tape of the first aspect may include a base material layer or may not include a base material layer, that is, may be base material-less. Meanwhile, the adhesive tape of the second aspect includes a base material layer, and the base material layer has the thickness of 10 to 500 μm, the breaking strength of 10 to 90 MPa, and the breaking elongation of 400% to 1,500%.

(1) Base Material Layer in the Adhesive Tape of the First Aspect

Hereinafter, the base material layer in a case where the adhesive tape of the first aspect includes the base material layer will be described. In a case where the adhesive tape of the first aspect includes the base material layer, the base material layer is not particularly limited as long as it is a layer capable of supporting the adhesive layer, and for example, a resin film, a rubber sheet, a foam sheet, a woven fabric, a non-woven fabric, paper, metal foil, and the like can be used. The base material layer may be a single layer, or may have a multilayer structure in which layers of the same or different materials are laminated. In addition, in the adhesive tape of the first aspect, the base material layer may have elongation properties or non-elongation properties.

Examples of the resin forming the resin film include a styrene-based resin such as a styrene-isoprene copolymer, a styrene-isoprene-styrene copolymer, a styrene-butadiene-styrene copolymer, a styrene-ethylene-butylene copolymer, or a styrene-ethylene-propylene copolymer; a polyurethane resin such as ester-based polyurethane and ether-based polyurethane; a polyolefin resin such as polyethylene and polypropylene; a polyester resin such as polyethylene terephthalate, polybutylene terephthalate, or polyethylene naphthalate; polystyrene; polycarbonate; polymethylpentene; polysulfone; polyether ether ketone; polyether sulfone; polyetherimide; a polyimide film; a fluororesin; nylon; an acrylic resin, a soft vinyl chloride-based resin, an elastic polyester-based resin, a soft polyolefin-based resin, and the like.

In addition, examples of the resin forming the foam sheet include a polyolefin resin, a polyester resin, a polyvinyl chloride resin, a polyphenylene sulfide resin, an amide-based resin, a polyimide-based resin, polyether ether ketone (PEEK), a styrene-based resin, a polyurethane-based resin, a rubber-based resin, and the like. Among these, it is preferable to contain at least one resin selected from the group consisting of a polyolefin resin, a polyurethane resin, an acrylic resin, and a rubber-based resin. Specifically, as the kind of the foam sheet, a polyolefin-based foam configured with a polyolefin resin such as polyethylene, polypropylene, an ethylene-propylene copolymer, and an ethylene-vinyl acetate copolymer; a polyurethane-based foam configured with a polyurethane resin; an acrylic-based foam configured with an acrylic resin; a rubber-based foam configured with acrylic-based rubber or other rubber-based resin such as elastomer can be used, and among these, the polyolefin-based foam can be preferably used, because it is easy to produce a thin closed foam structure having excellent followability and buffer absorbability to unevenness of a surface of the adherend.

Examples of the rubber sheet include a natural rubber sheet and a butyl rubber sheet. In addition, examples of metal foil include aluminum foil and copper foil.

Since the drop impact resistance due to the adhesive layer can be further increased and the impact resistance is further improved, the base material layer is preferably a resin film or a foam sheet, and preferably a resin film or a foam sheet configured with a resin selected from a styrene-based resin, a polyurethane resin, a polyolefin resin, and an acrylic resin. Among these, the resin film or the foam sheet configured with the styrene-based resin is more preferable, and the styrene-based resin film or the styrene-based resin foam sheet containing a styrene-isoprene copolymer and a styrene-isoprene-styrene copolymer is preferable.

The details of the styrene-based resin and the polyurethane resin constituting the base material layer can be the same as the details of the material for the base material of the base material layer in the adhesive tape of the second aspect which will be described later.

The base material layer of the adhesive tape of the first aspect may include random components such as an additive such as a tackifier resin, a crosslinking agent, an anti-aging agent, a UV absorber, a filler, a polymerization inhibitor, a surface modifier, an antistatic agent, a defoaming agent, a viscosity modifier, a light-resistant stabilizer, a weathering stabilizer, a heat-resistant stabilizer, an antioxidant, a leveling agent, an organic pigment, an inorganic pigment, a pigment dispersant, silica beads, or organic beads; an inorganic filler such as silicon oxide, aluminum oxide, titanium oxide, zirconia, and antimony pentoxide. These random components may be used alone or in a combination of two or more thereof.

In the adhesive tape of the first aspect, the thickness of the base material layer is not particularly limited, can be appropriately set according to the required characteristics, and can be, for example, 10 to 500 μm. The thickness of the base material layer in the adhesive tape of the first aspect is measured by the same method as a method for measuring the thickness of the base material layer in the adhesive tape of the second aspect which will be described later.

The shore A hardness of the base material layer in the adhesive tape of the first aspect is not particularly limited, and is preferably 20 A to 90 A, more preferably 30 A to 90 A, and even more preferably 40 A to 85 A. By using the base material layer having the shore A hardness within the range, the drop impact can be alleviated also in the base material layer, in addition to the adhesive layer. As a result, in a case where a product in which the adherend is fixed by using the adhesive tape of the first aspect is dropped, the adhesive tape easily absorbs the impact, the adherend can be protected from the impact, and it is possible to improve drop impact resistance of the adhesive tape.

The shore A hardness of the base material layer in the adhesive tape of the first aspect can be measured by the same method for measuring the rubber hardness of the base material layer in the adhesive tape of the second aspect which will be described later. In addition, the Shore A hardness can be adjusted by appropriately selecting a material, by changing the kind and molecular weight of the resin forming the base material layer or changing the monomer unit of the resin.

The base material layer may be surface-treated, for example, by corona treatment, chromic acid treatment, ozone exposure, flame exposure, high-voltage impact exposure, ionizing radiation treatment, coating treatment, and the like. This is because the adhesive strength with the adhesive layer can be increased, and the occurrence of peeling between the base material layer and the adhesive layer can be suppressed when the drop impact is received.

In the adhesive tape of the first aspect, other physical properties such as a breaking strength, a breaking elongation, a 100% modulus, and the like of the base material layer are not particularly limited, and can be appropriately set according to the required characteristics.

(2) Base Material Layer in the Adhesive Tape of the Second Aspect

The base material layer of the adhesive tape of the second aspect has a thickness of 10 to 500 μm, a breaking strength of 10 to 90 MPa, and a breaking elongation of 400% to 1,500%.

In the adhesive tape of the second aspect, the base material layer is not particularly limited as long as it has the characteristics, can be appropriately selected from well-known materials that can be used for the adhesive tape, and preferably contains the following materials for base material, and if necessary, other components may be further contained.

The base material layer may have a single-layer structure, or may have a multi-layer structure of two layers, three layers, or more layers.

In the adhesive tape of the second aspect, the base material layer has the breaking strength of 10 to 90 MPa, preferably 12 to 90 MPa, more preferably 30 to 90 MPa, and even more preferably 50 to 90 MPa. Since the breaking strength is 10 MPa or more, in a case where the adhesive tape is peeled off from the adherend, it is possible to peel the adhesive tape off from the adherend without tearing, even if the worker pulls it. In addition, since the breaking strength is 90 MPa or less, it is possible to prevent an excessive increase of a stress in a case where the worker pulls the adhesive tape.

In the adhesive tape of the second aspect, the breaking strength of the base material layer indicates a stress value measured, in a case where the base material layer is punched into a dumbbell shape with a marked line length of 20 mm and a width of 5 mm, and pulled and broken in a length direction at a tensile speed of 500 mm/min by using TENSILON tensile testing machine (model name: RTF-1210, manufactured by A & D Company, Limited) under conditions of a measurement atmosphere of 23° C. and 50% RH.

In addition, the breaking strength can be adjusted by a method for appropriately selecting a material and elongating it in a step of producing a base material layer.

In the adhesive tape of the second aspect, the base material layer has the breaking elongation of 400% to 1,500%, preferably 500% to 1,300%, more preferably 600% to 1,200%, and even more preferably 800% to 1,200%. Since the breaking elongation is 400% or more, even in a case where the adhesive tape is firmly adhered to the adherend, the stress when peeling the adhesive tape off does not excessively increase. In addition, since the breaking elongation is 1,500% or less, in a case of peeling the adhesive tape off, an elongation distance does not excessively increase, and accordingly, it is possible to work in a small space.

In the adhesive tape of the second aspect, the breaking elongation of the base material layer in the adhesive tape indicates a tensile elongation rate measured, in a case where the base material layer is punched into a dumbbell shape with a marked line length of 20 mm and a width of 5 mm, and pulled and broken in a length direction at a tensile speed of 500 mm/min by using TENSILON tensile testing machine (model name: RTF-1210, manufactured by A & D Company, Limited) under conditions of a measurement atmosphere of 23° C. and 50% RH.

In addition, the breaking elongation can be adjusted by a method for appropriately selecting a material and elongating it in a step of producing a base material layer.

In the adhesive tape of the second aspect, the base material layer has the 100% modulus of preferably 0.1 to 5 MPa, more preferably 0.5 to 4.5 MPa, and even more preferably 1 to 4 MPa. Since the 100% modulus is 0.1 MPa or more, it is possible to suppress defects due to shape deformation such as displacement when a load is applied to the adhesive tape or the adherend. In addition, since the 100% modulus is 5 MPa or less, in an initial stage of peeling the adhesive tape off from the adherend, the worker can pull it with a comparatively weak force.

In the adhesive tape of the second aspect, the 100% modulus of the base material layer in the adhesive tape indicates a stress value measured, in a case where the base material layer is punched into a dumbbell shape with a marked line length of 20 mm and a width of 5 mm, and pulled in a length direction at a tensile speed of 500 mm/min by using TENSILON tensile testing machine (model name: RTF-1210, manufactured by A & D Company, Limited) under conditions of a measurement atmosphere of 23° C. and 50% RH and the elongation reaches 100%.

In addition, the 100% modulus can be adjusted by a method for appropriately selecting a material and elongating it in a step of producing a base material layer.

In the adhesive tape of the second aspect, the base material layer has the rubber hardness of preferably 20 A to 90 A, more preferably 30 A to 85 A, even more preferably 40 A to 80 A, and still more preferably 40 A to 75 A. Since the rubber hardness is 20 A or more, it is possible to prevent the adhesive tape from being torn in a case where the adhesive tape is elongated and peeled off. In addition, since the rubber hardness is 90 A or less, the base material layer becomes soft, and for example, in a case where the adherend to which the adhesive tape is attached is dropped, or in a case where another object is dropped on the adherend to which the adhesive tape is attached, the adhesive tape easily absorbs the impact, and the adherend can be protected from impact (drop impact resistance and impact resistance of the adhesive tape can be improved).

The rubber hardness of the base material layer is Shore A hardness and indicates a value measured based on JIS K6253 using a durometer (spring type rubber hardness tester) (model name: GS-719G, manufactured by TECLOCK Co., Ltd.).

In addition, the rubber hardness can be adjusted by a method for selecting an appropriate material by, for example, changing a molecular weight of a resin or, in a case of containing a styrene monomer unit, changing the monomer unit.

In the adhesive tape of the second aspect, the base material layer has the thickness of 10 to 500 μm, preferably 30 to 250 μm, and more preferably 50 to 200 μm. Since a case where the thickness is 10 μm or more, it is possible to ensure the strength of the adhesive tape, and since the thickness is 500 μm or less, it is possible to prevent the adhesive tape becoming difficult to be pulled due to an excessive increase of thickness thereof.

In the present specification, a "thickness of the base material layer" indicates an average value of measured values of thicknesses of random 5 places in the base material layer which are measured using TH-104, a thickness measuring machine for paper and film (manufactured by Tester Sangyo Co., Ltd.).

In the adhesive tape of the second aspect, a ratio of the thicknesses of the adhesive layer to the base material layer is not particularly limited and can be appropriately selected according to the purpose. The ratio of the thickness of the adhesive layer to the thickness of the base material layer represented by [thickness of the adhesive layer/thickness of the base material layer] is preferably 1/5 to 5/1, more preferably 1/3 to 3/1, and even more preferably 1/2 to 2/1. In a case where the ratio of the thickness of the adhesive layer to the thickness of the base material layer is within the preferable range, it is possible to obtain excellent adhesiveness and re-peeling property (ease of peeling) of the adhesive tape. On the other hand, in a case where the ratio is larger than 5/1, only the adhesive layer may remain on the adherend in a re-peeling step of the adhesive tape. In addition, in a case where the ratio is smaller than 1/5, there is a concern that the adhesive layer cannot follow a surface of the adherend, in a case where the surface has an uneven shape or the like, thereby decreasing the adhesive strength.

<<Material for Base Material>>

In the adhesive tape of the second aspect, examples of the material for the base material constituting the base material layer include a styrene-based resin such as a styrene-isoprene copolymer, a styrene-isoprene-styrene copolymer, a styrene-butadiene-styrene copolymer, a styrene-ethylene-butylene copolymer, or a styrene-ethylene-propylene copolymer; a polyurethane resin such as ester-based polyurethane and ether-based polyurethane; a polyolefin resin such as polyethylene and polypropylene; a polyester resin such as polyethylene terephthalate, polybutylene terephthalate, or polyethylene naphthalate; polystyrene; polycarbonate; polymethylpentene; polysulfone; polyether ether ketone; polyether sulfone; polyetherimide; a polyimide film; a fluororesin; nylon; an acrylic resin, and the like. These may be used alone or in a combination of two or more thereof, and it is preferable to use the combination of two or more thereof.

Among these, the styrene-based resins or the polyurethane resins are preferable because it has excellent drop impact resistance and it is easy to obtain suitable breaking strength or breaking elongation, and the styrene-based resins are more preferable, and among these, it is particularly preferable to use a combination of the styrene-isoprene copolymer and the styrene-isoprene-styrene copolymer, because high drop impact resistance and impact resistance are exhibited and the breaking elongation or the breaking strength can be achieved, by combining with the specific adhesive layer described above.

—Styrene-Based Resin—

Since the styrene-based resin is a resin exhibiting thermoplasticity, it is excellent in moldability such as extrusion molding and injection molding, and it is easy to mold the base material layer. In addition, the styrene-based resin can be suitably used as a base material for the adhesive sheet of the second aspect, because it is easy to obtain a particularly excellent breaking elongation in a group of resins generally called a thermoplastic resin and also has excellent drop impact resistance.

Therefore, in the base material, the ratio of the styrene-based resin to the total resin components is preferably 50% to 100%, more preferably 60% to 100%, even more preferably 65% to 100%, and particularly preferably 70% to 100%. In a case where the ratio of the styrene-based resin is within the preferable range, it is possible to obtain a base material layer having excellent breaking elongation and breaking strength.

As the styrene-based resin, for example, a styrene-based resin having a single structure of a linear structure, a branched structure, or a multi-branched structure may be used, or a mixture of different structures may be used. The styrene-based resin having abundant linear structure can impart excellent breaking elongation to the base material layer. On the other hand, the styrene-based resin having a branched structure or a multi-branched structure in which a styrene block is arranged at a molecular terminal can have a pseudo-crosslinked structure and can impart excellent cohesive force. Therefore, it is preferable to mix and use the styrene-based resin according to the required mechanical characteristics.

As the styrene-based resin, the structural unit represented by Chemical Formula (1) with respect to the total mass of the styrene-based resin is preferably 13% by mass to 60% by mass, more preferably 15% by mass to 50% by mass, even more preferably 15% by mass to 45% by mass, and particularly preferably 15% by mass to 35% by mass. In a case where the ratio of the structural unit represented by Chemical Formula (1) to the total mass of the styrene-based resin is within the preferable range, it is easy to obtain the breaking elongation and the breaking strength within the suitable range. * in Chemical Formula (1) is an atomic bonding representing a bond with another atom, and the same applied to Chemical Formulae (2) and (3) which will be described later.

[Chem. 1]

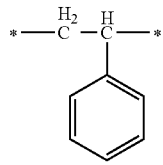

(1)

In a case where the styrene-isoprene copolymer and the styrene-isoprene-styrene copolymer are used in combination as the styrene-based resin, the content of the styrene-isoprene copolymer with respect to the total mass of the styrene-isoprene copolymer and the styrene-isoprene-styrene copolymer is preferably 0% by mass to 80% by mass, more preferably 0% by mass to 70% by mass, even more preferably 0% by mass to 50% by mass, and particularly preferably 0% by mass to 30% by mass. In a case where the content of the styrene-isoprene copolymer is within the preferable range, it is possible to achieve both thermal durability while maintaining excellent breaking elongation or breaking strength.

In addition, as the styrene-isoprene copolymer, it is preferable to use a styrene-isoprene copolymer having the weight average molecular weight measured in terms of standard polystyrene using the gel permeation chromatograph (GPC) of 10,000 to 800,000, it is more preferable to use a styrene-isoprene copolymer having the weight average molecular weight of 30,000 to 500,000, and it is even more preferable to use the styrene-isoprene copolymer having the weight average molecular weight of 50,000 to 300,000. In a case where the weight average molecular weight of the styrene-isoprene copolymer is within the preferable range, heat fluidity and compatibility during solvent dilution can be ensured, so that the workability in the production step is excellent and it is possible to obtain a base material layer having thermal durability.

Here, the measurement of the weight average molecular weight of the styrene-isoprene copolymer by the GPC method is a standard polystyrene conversion value measured by using a GPC apparatus (SC-8020, manufactured by Tosoh Corporation), and the measurement conditions are as follows.

—Measurement Conditions—

Sample concentration: 0.5% by mass (tetrahydrofuran solution)

Sample injection amount: 100 μL

Eluent: Tetrahydrofuran

Flow rate: 1.0 mL/min

Measurement temperature: 40° C.

Main column: two TSKgel (registered trademark) GMHHR-H (20)

Guard column: TSKgel HXL-H

Detector: Differential refractometer

Standard polystyrene molecular weight: 10,000 to 20,000, 000 (manufactured by Tosoh Corporation)

The method for producing the styrene-isoprene copolymer, the styrene-isoprene-styrene copolymer, and a mixture of the styrene-isoprene copolymer and the styrene-isoprene-styrene copolymer is not particularly limited, and can be appropriately selected from well-known producing methods of the related art. A block copolymer is obtained by the anion living polymerization method, a coupling agent is added if necessary, a reaction is allowed, and thereby obtaining a styrene-based resin.

Specifically, the method for producing the styrene-isoprene copolymer is not particularly limited and can be appropriately selected from well-known production methods of the related art, and for example, a method for sequentially polymerizing a styrene block and an isoprene block by the anion living polymerization method is used.

The method for producing the styrene-isoprene-styrene copolymer is not particularly limited and can be appropriately selected from well-known production methods of the related art, and examples thereof include a method for sequentially polymerizing a styrene block and an isoprene block by the anion living polymerization method, a method for producing a block copolymer having a living active terminal, allowing a reaction with a coupling agent to produce a coupled block copolymer, and the like.

The method for producing a mixture of the styrene-isoprene copolymer and the styrene-isoprene-styrene copolymer is not particularly limited and can be appropriately selected from well-known production methods of the related art, and for example, a method for mixing the styrene-isoprene copolymer and the styrene-isoprene-styrene copolymer produced in the method is used.

In addition, as a method for producing the mixture of the styrene-isoprene copolymer and the styrene-isoprene-styrene copolymer, it is also possible to produce the mixture as a mixture at the same time in one polymerization step.

As a more specific embodiment, by the anion living polymerization method, first, a styrene monomer is polymerized in a polymerization solvent using an anionic polymerization initiator to form a polystyrene block having a living active terminal. Second, isoprene is polymerized from the living active terminal of the polystyrene block to obtain a styrene-isoprene diblock copolymer having a living active terminal. Third, a part of the styrene-isoprene diblock copolymer having a living active terminal is reacted with the coupling agent to form a coupled styrene-isoprene-styrene block copolymer. Fourth, the residue of the styrene-isoprene diblock copolymer having a living active terminal is deactivated by using a polymerization inhibitor to deactivate the living active terminal to form a styrene-isoprene diblock copolymer.

—Polyurethane Resin—

The polyurethane resin is not particularly limited and can be appropriately selected according to the purpose, and a polyurethane resin having a softening point of 40° C. or higher is preferable, and a polyurethane resin having a softening point of 50° C. or higher is more preferable. In addition, the upper limit of the softening point is preferably 100° C. or lower. The softening point refers to a value measured based on JIS K 2207 (dry-bulb type) (hereinafter, the same applies to the softening point).

As the polyurethane resin, a reaction product of a polyol (b1-1) and a polyisocyanate (b1-2) can be preferably used.

The polyol (b1-1) is not particularly limited and can be appropriately selected according to the purpose, and examples thereof include polyester polyol, polyether polyol, polycarbonate polyol, and acrylic polyol. These may be used alone or in a combination of two or more thereof. Among these, as the polyol (b1-1), polyester polyol and polyether polyol are preferable because it is possible to obtain the mechanical characteristics of the base material layer. In the base material layer, it is preferable to use polyester polyol in a case where heat resistance is required, and it is preferable to use polyether polyol in a case where water resistance and biodegradability are required.

Examples of the polyester polyol include polyester obtained by esterifying a low molecular weight of polyol and a polycarboxylic acid, polyester obtained by ring-opening polymerization reaction of a cyclic ester compound such as ε-caprolactone, and copolymerized polyester thereof.

As the low molecular weight polyol that can be used for producing polyester polyol, aliphatic alkylene glycol such as ethylene glycol, propylene glycol, 1,4-butanediol, 1,6-hexanediol, diethylene glycol, neopentyl glycol, 1,3-butanediol, having the weight average molecular weight of approximately 50 to 300, or cyclohexane dimethanol can be used.

Examples of the polycarboxylic acid include aliphatic dicarboxylic acid such as succinic acid, adipic acid, sebacic acid, and dodecanedicarboxylic acid; aromatic dicarboxylic acid such as terephthalic acid, isophthalic acid, phthalic acid, and naphthalenedicarboxylic acid; and anhydrous thereof and an esterified product thereof.

Examples of the polyether polyol include those obtained by addition-polymerizing an alkylene oxide using one or more compounds having two or more active hydrogen atoms as an initiator.

As the polycarbonate polyol, for example, a material obtained by reacting a carbonic acid ester and/or phosgene with a low molecular weight polyol which will be described later can be used.

Examples of the carbonic acid ester include methyl carbonate, dimethyl carbonate, ethyl carbonate, diethyl carbonate, cyclocarbonate, diphenylcarbonate, and the like.

Examples of low-molecular-weight polyol capable of reacting with carbonic ester and/or phosgene that can be used in the production of polycarbonate polyol include ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-ethyl-1,3-propanediol, 3-methyl-1,5-pentanediol, 2-ethyl-1,3-hexanediol, 2-methyl-1,8-octanediol, 1,4-cyclohexane dimethanol, hydroquinone, resorcin, bisphenol A, bisphenol F, 4,4'-biphenol, and the like.

The polyisocyanate (b1-2) is not particularly limited and can be appropriately selected according to the purpose, and for example, alicyclic polyisocyanate, aliphatic polyisocyanate, aromatic polyisocyanate, or the like can be used, and the alicyclic polyisocyanate and the like is used. These may be used alone or in a combination of two or more thereof.

Examples of the alicyclic polyisocyanate include isophorone diisocyanate, 1,3-bis (isocyanatomethyl) cyclohexane, 4,4'-dicyclohexylmethanediisocyanate, 2,4-methyl-cyclohexanediisocyanate, 2,6-methylcyclohexanediisocyanate, cyclohexylene diisocyanate, methylcyclohexylene diisocyanate, bis (2-isosyanatoethyl)-4-cyclohexylene-1,2-dicarboxylate, 2,5-norbornane diisocyanate, 2,6-norbornane diisocyanate, dimerate diisocyanate, bicycloheptane triisocyanate, and the like. These may be used alone or in a combination of two or more thereof.

The method for producing the polyurethane resin (b1) by reacting the polyol (b1-1) with the polyisocyanate (b1-2) is not particularly limited, and can be appropriately selected from well-known production methods of the related art. For example, a method for removing moisture by heating the polyol (b1-1) put into the reaction vessel under normal pressure or reduced pressure conditions and supplying and reacting the polyisocyanate (b1-2) in a lump or split can be used.

In the reaction between the polyol (b1-1) and the polyisocyanate (b1-2), the weight ratio (NCO/OH weight ratio) of the isocyanate group (NCO) contained in polyisocyanate (b1-2) and a hydroxyl group (OH) contained in polyol (b1-1) is preferably 1.0 to 20.0, more preferably 1.1 to 13.0, even more preferably 1.2 to 5.0, and particularly preferably 1.5 to 3.0.

The reaction conditions between the polyol (b1-1) and the polyisocyanate (b1-2) are not particularly limited and can be appropriately selected in consideration of various conditions such as safety, quality, and cost, and the reaction temperature is preferably 70° C. to 120° C., and the reaction time is preferably 30 minutes to 5 hours.

In a case where the polyol (b1-1) is reacted with the polyisocyanate (b1-2), for example, a tertiary amine catalyst, an organometallic catalyst, or the like can be used as a catalyst, if necessary.

In addition, the reaction may be carried out in a solvent-free environment or in the presence of an organic solvent.

The organic solvent is not particularly limited and can be appropriately selected according to the purpose, and examples thereof include an ester-based solvent such as methyl acetate, ethyl acetate, propyl acetate, and butyl acetate; a ketone-based solvent such as acetone, methyl ethyl ketone, methyl butyl ketone, and cyclohexanone; an ether ester-based solvent such as methyl cellosolve acetate and butyl cellosolve acetate; an aromatic hydrocarbon-based solvent such as toluene and xylene; an amide-based solvent such as dimethylformamide and dimethylacetamide; and the like. These may be used alone or in a combination of two or more thereof.

The organic solvent may be removed during the production of the polyurethane resin (b1) or after the polyurethane (b1) is produced by an appropriate method such as heating under reduced pressure and drying under normal pressure.

—Other Components—

The other components in the base material layer are not particularly limited and can be appropriately selected as long as the characteristics of the adhesive tape are not impaired, and examples thereof include a tackifier resin; a polymer component other than the materials for the base material; an additive such as a crosslinking agent, an anti-aging agent, a UV absorber, a filler, a polymerization inhibitor, a surface modifier, an antistatic agent, a defoaming agent, a viscosity modifier, a light-resistant stabilizer, a weathering stabilizer, a heat-resistant stabilizer, an antioxidant, a leveling agent, an organic pigment, an inorganic pigment, a pigment dispersant, silica beads, or organic beads; an inorganic filler such as silicon oxide, aluminum oxide, titanium oxide, zirconia, and antimony pentoxide. These may be used alone or in a combination of two or more thereof.

The content of other components in the base material layer can be appropriately selected as long as the characteristics of the adhesive tape are not impaired.

The tackifier resin can be used to increase adhesiveness between the adhesive layer of the adhesive tape and the base material layer or increase heat resistance.

The tackifier resin is not particularly limited and can be appropriately selected according to the purpose, and a tackifier resin having a softening point of 80° C. or higher is preferable, a tackifier resin having a softening point of 90° C. or higher is more preferable, a tackifier resin having a softening point of 100° C. or higher is even more preferable, and a tackifier resin having a softening point of 110° C. or higher is particularly preferable.

As the tackifier resin, for example, those described in a section of "-rubber-based adhesive resin-" which will be described later can be used, and the preferred embodiment is also the same.

The anti-aging agent is not particularly limited and can be appropriately selected from well-known anti-aging agents according to the purpose, and examples thereof include a phenol-based anti-aging agent, a phosphorus-based anti-aging agent (also referred to as a "processing stabilizer"), an amine-based anti-aging agent, an imidazole-based anti-aging agent, and the like. These may be used alone or in a combination of two or more thereof. Among these, the phenol-based anti-aging agent and the phosphorus-based anti-aging agent are preferable, and using these in combination is preferable, because it is possible to effectively improve the heat-resistant stability of the materials for the base material, and as a result, it is possible to obtain an adhesive tape maintaining excellent initial adhesiveness and having more excellent thermal durability. The phosphorus-based anti-aging agent may slightly discolor (turn yellow) over time in a high temperature environment, and accordingly, it is preferable that the amount thereof used is appropriately set in consideration of the balance between initial adhesiveness, thermal durability, and discoloration prevention.

As the phenol-based anti-aging agent, generally, a phenol-based compound having a steric hindrance group can be used, and a monophenol type, a bisphenol type, and a polyphenol type are typical. Specific examples thereof include 2,6-di-t-butyl-4-methylphenol, 2,2'-methylenebis (4-methyl-6-t-butylphenol), 2,2'-methylenebis (4-ethyl-6-t-butylphenol), 4,4'-thiobis (6-t-butyl-3-methylphenol), 4,4'-butylidenebis-(3-methyl-6-t-butylphenol), tetrakis-[methylene-3-(3'5'-di-t-butyl-4-hydroxyphenyl) propionate] methane, n-octadecyl-3-(4'-hydroxy-3' 5'-di-t-butylphenyl) propionate, and the like. These may be used alone or in a combination of two or more thereof.

The amount of the phenol-based anti-aging agent used is not particularly limited, can be appropriately selected according to the purpose, and is preferably 0.1 part by mass to 5 parts by mass with respect to 100 parts by mass of the materials for the base material, and in a case where 0.5 parts by mass to 3 parts by mass thereof is used, it is possible to effectively improve the heat-resistant stability of the materials for the base material, and as a result, it is possible to obtain an adhesive tape maintaining excellent initial adhesiveness and having more excellent thermal durability.

<Adhesive Layer>

In the present embodiment, the adhesive tape includes an adhesive layer for exhibiting the drop impact resistance and the adhesive strength. In a case where the adhesive tape of the present embodiment includes the base material layer, the adhesive layer is provided on one surface or both surfaces of the base material layer. In the present embodiment, the adhesive layer in the adhesive sheet of the first aspect and the adhesive layer in the adhesive sheet of the second aspect each contain the particles having an average particle diameter of 4 to 40 μm and a surface of which is a silicone resin, and the adhesive resin, and the content of the particles is 3 to 50 parts by mass with respect to 100 parts by mass of the adhesive resin.

The adhesive composition forming the adhesive layer preferably contains the particles and the adhesive resin. In addition, the adhesive composition can further contain other components, if necessary, in addition to the particles and the adhesive resin.

The adhesive layer in the present embodiment exhibits the following effects by containing particles the surface of which is the silicone resin and keeping the average particle diameter of the particles and the blending amount with respect to the adhesive resin within predetermined ranges. First, since the surface energy of the silicone resin constituting the surface of the particles is low, the average particle diameter of the particles is set in the predetermined range and the blending amount with respect to the adhesive resin is set in the predetermined range, and accordingly, it is possible to suppress aggregation of particles and uniformly disperse in the adhesive layer in a state of primary particles. In addition, since the silicone resin constituting the surface of the particles has a low surface energy, the adhesiveness to the adhesive resin is low. Therefore, in a case where a stress due to a drop impact (drop impact force) is applied to the adhesive layer, a cavity is likely to be formed at the interface between the adhesive resin and the silicone resin, and the cavity functions as a buffer to alleviate the stress. Since the average particle diameter of the particles the surface of which is the silicone resin is within a predetermined range, and the blending amount with respect to the adhesive resin is within a predetermined range, when the stress due to a drop impact is applied, the cavities are formed around the particles uniformly dispersed in a state of primary particles in the entire area of the adhesive layer. Accordingly, it is possible to alleviated the stress due to the drop impact in the entire area of the layer, thereby exhibiting excellent drop impact resistance.

Here, the adhesive layer containing particles the surface of which is the silicone resin can form the cavity between the particles the surface of which is the silicone resin and the adhesive resin, even in a case where the point impact is received due to a collision of another object to the adherend to which the adhesive layer is attached, not only in a case where the surface impact is received due to the dropping of the adherend to which the adhesive layer is attached. However, in a case of point impact, it is presumed that the effect of stress alleviation due to the deformation and follow-up of the adhesive layer to distortion of the adherend when the impact is received is higher than the stress alleviation by the cavity. On the other hand, in a case of surface impact, since the impact is received on the entire surface, it is difficult to obtain the effect of stress alleviation by deformation and follow-up. Therefore, as a result of intensive studies of the present inventors, an increase of the function of alleviating the drop impact stress by the cavity is acknowledged and the drop impact resistance is improved by adjusting the average particle diameter and the content of the particles the surface of which is the silicone resin contained in the adhesive layer.

The stress at 25% elongation of the adhesive layer is not particularly limited, can be appropriately selected according to the purpose, and is preferably 0.04 MPa to 0.4 MPa and more preferably 0.05 MPa to 0.1 MPa. In a case where the stress at 25% elongation of the adhesive layer is within the preferable range, the adhesive layer is less likely to be aggregated and broken when the impact such as dropping is applied, and the drop impact resistance can be improved. In addition, in the adhesive tape of the second aspect, since the stress at 25% elongation of the adhesive layer is within the range, it is possible to comparatively easily peel it off even when elongating and peeling it off. On the other hand, in a case where the stress at 25% elongation of the adhesive layer is less than 0.04 MPa, the adhesive layer may be aggregated and broken when the impact such as dropping is applied, which makes it difficult to obtain the drop impact resistance, and the adhesive tape may be peeled off, in a case where a load in a shear direction of the adhesive tape is generated while fixing hard adherends. On the other hand, in a case where the stress exceeds 0.4 MPa, an amount of displacement of the adhesive layer may decrease when the impact such as dropping is applied, and in the adhesive tape of the second aspect, necessary strength may excessively increase, in order to elongate the adhesive tape when peeling it off.

The stress at 25% elongation of the adhesive layer indicates a stress value measured, in a case where the adhesive layer is punched into a dumbbell shape with a marked line length of 20 mm and a width of 10 mm, and pulled and elongation by 25% in a length direction at a tensile speed of 300 mm/min by using TENSILON tensile testing machine (model name: RTF-1210, manufactured by A & D Company, Limited) under conditions of a measurement atmosphere of 23° C. and 50% RH.

The breaking strength of the adhesive layer is not particularly limited, can be appropriately selected according to the purpose, and is preferably 0.5 MPa to 2.1 MPa and more preferably 1.0 MPa to 2.1 MPa. In a case where the breaking strength of the adhesive layer is within the preferable range, the adhesive layer is less likely to be aggregated and broken when impact such as dropping is applied, and a suitable displacement amount can be maintained, thereby increasing the drop impact resistance. In addition, in the adhesive tape of the second aspect, it is possible to suppress the adhesive tape from being torn even when the adhesive tape is elongated and peeled off, and the load for elongating the adhesive tape does not excessively increase, and therefore the re-peeling operation by peeling is easily performed. On the other hand, in a case where the breaking strength of the adhesive layer is less than 0.5 MPa, the adhesive layer is aggregated and broken when the impact such as dropping is applied, so that it is difficult to obtain the drop impact resistance, and in the adhesive tape of the second aspect, when it is elongated and peeled off, the adhesive residue due to the aggregation breaking of the adhesive layer may be generated. On the other hand, in a case where it exceeds 2.1 MPa, the displacement amount of the adhesive layer may decrease when the impact such as dropping is applied, so that it is difficult to obtain the drop impact resistance and sufficient adhesiveness cannot be obtained. The force required to elongate and deform the adhesive tape depends even on a thickness of the adhesive tape. For example, even in a case where the adhesive tape is thick and the adhesive tape having high breaking strength is attempted to elongate to peel it off, the adhesive tape may not be sufficiently elongated and peeled off.

The breaking strength of the adhesive layer indicates a stress value measured, in a case where the adhesive layer is punched into a dumbbell shape with a marked line length of 20 mm and a width of 10 mm, and pulled and broken in a length direction at a tensile speed of 300 mm/min by using TENSILON tensile testing machine (model name: RTF-1210, manufactured by A & D Company, Limited) under conditions of a measurement atmosphere of 23° C. and 50% RH.

The breaking elongation of the adhesive layer is not particularly limited, can be appropriately selected according to the purpose, and is preferably 450% to 1,300%, more preferably 500% to 1,200%, and even more preferably 600% to 1,100%. In a case where the breaking elongation of the adhesive layer is within the preferable range, the adhesive layer is less likely to be aggregated and broken when impact is applied, and a suitable displacement amount can be maintained while exhibiting suitable adhesive strength, thereby increasing the drop impact resistance. In addition, in the adhesive sheet of the second aspect, it is possible to achieve both suitable adhesiveness and re-peeling property (easiness of peeling).

The breaking elongation of the adhesive layer indicates a tensile elongation rate measured, in a case where the adhesive layer is punched into a dumbbell shape with a marked line length of 20 mm and a width of 10 mm, and pulled and broken in the length direction at the tensile speed of 300 mm/min by using TENSILON tensile testing machine (model name: RTF-1210, manufactured by A & D Company, Limited) under conditions of a measurement atmosphere of 23° C. and 50% RH.

The thickness of the adhesive layer is not particularly limited as long as it has a size capable of exhibiting desired adhesiveness and drop impact resistance, and can be appropriately selected according to the purpose. In a case where the adhesive tape of the present embodiment is a base material-less tape having no base material layer, the thickness of the adhesive layer is preferably 5 μm to 500 μm, more preferably 20 μm to 400 μm, even more preferably 25 μm to 300 μm, and particularly preferably 50 μm to 150 μm. On the other hand, in a case where the adhesive tape of the present embodiment includes the base material layer, the thickness of the adhesive layer is preferably 5 μm to 150 μm, more preferably 20 μm to 120 μm, even more preferably 40 μm to 110 μm, and particularly preferably 50 μm to 100 μm. In a case where the adhesive tape includes the adhesive layer on one or both sides of the base material layer, the "thickness of the adhesive layer" means the thickness of the adhesive layer on one side of the adhesive tape. In a case where the adhesive tape has adhesive layers on both sides, the average thickness of the adhesive layer on one side and the average thickness of the adhesive layer on the other side may be the same or different, and is preferably the same.

In the present specification, the thickness of the adhesive layer can be measured by the following method. That is, after immersing the adhesive tape in liquid nitrogen for 1 minute, the adhesive tape is bent and split in liquid nitrogen using tweezers with a width direction of the adhesive tape as a fold, and a section for observing a split surface in the thickness direction of the adhesive tape is produced. After returning the section to room temperature in a desiccator, the section is fixed on a sample table so that an electron beam is vertically incident on the split surface, and the split surface is observed using an electron microscope. Based on the scale of the electron microscope, the thickness of the adhesive layer in the adhesive tape is measured at 10 points, and the arithmetic average value thereof is defined as the thickness of the adhesive layer. The thickness of the adhesive layer is a length measured from a surface on one side to a surface on the other side along a stacking direction.

The adhesive layer in the present embodiment is formed of an adhesive composition containing at least particles the surface of which is a silicone resin having a predetermined average particle diameter and an adhesive resin. In addition, the adhesive composition can further contain any component in addition to the particles the surface of which is silicone resin and the adhesive resin, if necessary. Hereinafter, each component contained in the adhesive composition constituting the adhesive layer will be described.

—Particles Surface of which is Silicone Resin—

In the present embodiment, the adhesive composition which is a precursor of the adhesive layer contains particles having an average particle diameter of 4 to 40 μm and a surface of which is a silicone resin. Since the adhesive composition, which is a precursor of the adhesive layer, contains the particles, even in a case where the drop impact is received when the product in which the adherend is fixed to the adhesive tape is dropped, the impact force is dispersed and alleviated by the cavity formed between the particles dispersed in the entire area in the adhesive layer and the adhesive resin, and thereby suppressing the peeling or the breaking of the adhesive layer. In addition, since the adhesive composition forming the adhesive layers contains the particles, the particles are exposed from the adhesive layer when the adhesive tape of the second aspect is elongated, and the adhesive area between the adhesive layer and the adherend decreases, and the friction resistance is lowered by the particles interposed between the adhesive surfaces, thereby effectively decreasing the adhesive strength. Therefore, even in a case where an elongation direction of the adhesive tape is at a comparatively large angle with respect to an attachment surface of the adherend, for example, a vertical direction (also referred to as a "90° direction"), or even in a case where the adhesive tape is elongated at a high speed, it is possible to more easily and rapidly peel the adhesive tape off.

In a case where the adhesive composition contains a filler and the like, the adhesive performance may be reduced due to the addition of the filler. However, since the particles the surface of which is the silicone resin have excellent dispersibility in the adhesive composition, a decrease in adhesive performance due to adding the particles is suppressed and it is possible to ensure the adhesive strength of the adhesive tape. Although the reason why the dispersibility is excellent is not clear, it is presumed that the particles the surface of which is the silicone resin have a low surface energy of the particles and the particles are less likely to adhere to each other, and the aggregation such as secondary particles and the like does not occur.

In addition, since the particles the surface of which is the silicone resin have excellent dispersibility in the adhesive composition, the particles are not unevenly distributed in the adhesive layer and can be widely dispersed over the entire area of the layer. Accordingly, compared to an adhesive layer containing a filler that does not contain a silicone resin on the surface, such as silicone rubber particles, for example, the particles the surface of which is the silicone resin are dispersed throughout the adhesive layer, thereby dispersing and alleviating the drop impact force in the layer even when the drop impact is received. In addition, in a case where the drop impact force is applied, the particles the surface of which is the silicone resin can form a cavity at the interface between the particle surface and the adhesive resin, and the cavity improves the drop impact resistance. Further, it is possible to suppress the peeling from the adherend or the aggregation breaking of the adhesive layer by the cavity.

The particles the surface of which is the silicone resin may be particles having a region formed of silicone resin on the surface of the particles, and for example, the particles themselves formed of the silicone resin, or particles a part or all of the surface of which is the silicone resin. As the particles having the silicone resin on the entire surface, for example, particles having a shell having a surface formed of the silicone resin and having a hollow inside of the shell can be used. In addition, the particles a part or all of the surface of which is the silicone resin can have an internal material as a compound other than the silicone resin (in other words, for example, particles other than the silicone resin, and the surface thereof is coated with silicone resin), and the internal material is preferably a material having rubber elasticity as the silicone rubber. That is, the particles the surface of which is the silicone resin are preferably particles having a core-shell structure in which the core is formed of a rubber material and the shell covering each of the cores is formed of the silicone resin. In a case where the internal material of the particles is an elastic material, the adhesive performance of the adhesive layer can be more effectively ensured. The reason for this is not clear, but when the particles are mixed with a solvent or the like when forming the adhesive composition, it is presumed that the particles oil-absorb the solvent that has permeated the surface of the silicone resin and it is possible to exhibit compatibility with the adhesive resin, compared to a case where the entire particles are silicone resin particles. In addition, by improving the compatibility, the decrease in the adhesive performance of the adhesive layer is further suppressed. Examples of the rubber material constituting the core include silicone, acrylic rubber, and diene rubber, and among these, silicone rubber having a low glass transition temperature and easy to adjust is preferable. This is because the low glass transition temperature activates the micromotion of the molecule, and the impact force from the outside is easily converted by heat even in the core to be alleviated, and the drop impact resistance can be further improved.

These particles may be used alone or in a combination of two or more thereof. The particles can be produced by a well-known production method and are available as commercially available products.

Specific examples of the particles in which the inside of the particles is silicone rubber and the silicone resin is present on the surface thereof are silicone rubber particles obtained by three-dimensionally crosslinking a linear organopolysiloxane (see JP-A-63-77942, JP-A-3-93834, and JP-A-04-198324), or particles having a structure in which the surface of particles obtained by powdering the silicone rubber (see U.S. Pat. No. 3,843,601, JP-A-62-270660, and JP-A-59-96122) is coated with a silicone resin which is a cured product of polyorganosylsesquioxane having a structure crosslinked into a three-dimensional network shape represented by $(R'SiO_{3/2})_n$ (R' represents a substituted or unsubstituted monovalent hydrocarbon group), and coated with the silicone resin (see JP-A-7-196815).

As such silicone particles, commercially available products such as trade names of Trefil E-500, Trefil E-600, Trefil E-601, Trefil E-850, and the like from Dow Corning Toray Silicone Co., Ltd. and KMP-600, KMP-601, KMP-602, KMP-605, and the like from Shin-Etsu Chemical Co., Ltd. can be used.

As the particles whose particles themselves are formed of silicone resin, polyorganosylsesquioxane fine powder can be used.

The shape of the particles the surface of which is the silicone resin is not particularly limited and can be appropriately selected according to the purpose, and may be a regular shape or an irregular shape. Specific examples of the shape of the particles include polygon, cube, ellipse, sphere, needle, flat plate, scales, and the like, and among these, the shapes of the particles are preferably ellipses, spheres, and polygons, and more preferably it is spherical. In a case where the shape of the particles is the elliptical shape, the spherical shape, the polygonal shape, or the like, the adhesive layer slides smoothly on the adherend when the adhesive tape is elongated, and it is possible to more easily and rapidly peel the adhesive tape off. The particles having these shapes may be used alone or in a combination of two or more thereof.

The particle size distribution (D90/D10) of the particles the surface of which is the silicone resin is not particularly limited, can be appropriately selected according to the purpose, and is preferably 2.5 to 20, from a viewpoint of drop impact resistance and impact resistance, more preferably 2.5 to 15, and even more preferably 2.5 to 5. In a case where the particle size distribution (D90/D10) of the particles is within a preferable range, the adhesive tape is excellent in drop impact resistance, impact resistance, shear adhesive strength, and split adhesive strength. In addition, particularly, in the adhesive tape of the second aspect, it is possible to more easily and rapidly peel the adhesive tape off, and even in a case where the thickness of the base material of the adhesive tape is thin, the adhesive tape is not likely to be torn, and excellent drop impact resistance, impact resistance, shear adhesive strength, and split adhesive strength are obtained. On the other hand, in a case where the particle size distribution (D90/D10) of the particles is less than 2.5, in the adhesive tape of the second aspect, the elongation peeling property may be impaired, and in a case where the particle size distribution thereof exceeds 20, the adhesive performance such as drop impact resistance, impact resistance, shear adhesive strength, split adhesive strength, and the like may be impaired.

The particle size distribution (D90/D10) of the particles can be obtained by measuring the average particle diameter of the particles by using, for example, a measuring machine (microtrack) using a laser diffraction scattering method and converting it into a particle size distribution.

The average particle diameter of the particles the surface of which is the silicone resin is 4 to 40 μm, preferably 5 to 40 μm, more preferably 10 to 35 μm, even more preferably 10 to 33 μm, and most preferably 10 to 25 μm. In a case where the average particle diameter of the particles is within a preferable range, a cavity formed at the interface between the adhesive resin and the particles the surface of which is the silicone resin when the drop impact force is applied provides a suitable drop impact resistance. In addition, in the adhesive tape of the second aspect, it is possible to more easily and rapidly peel the adhesive tape off, and even in a case where the thickness of the base material of the adhesive tape is thin, the adhesive tape is not likely to be torn, and excellent impact resistance, shear adhesive strength, and split adhesive strength are obtained. In a case where the average particle diameter of the particles is less than 2 μm, the cavity formed at the interface between the adhesive resin and the particles the surface of which is the silicone resin when the drop impact force is applied becomes too small, and it may be difficult to exhibit drop impact resistance. In addition, in the adhesive tape of the second aspect, the elongation peeling property may be impaired. On the other hand, in a case where the average particle diameter of the particles exceeds 40 μm, coarse particles are likely to exist, so that there is a concern that coarse particles larger than the thickness of the adhesive layer may be mixed, and it may be difficult to obtain suitable adhesive strength. In addition, the adhesive performance such as drop impact resistance, impact resistance, shear adhesive strength, and split adhesive strength may be impaired.

The average particle diameter of the particles refers to a volume average particle diameter, and can be measured by using, for example, a measuring machine (microtrack) using a laser diffraction scattering method.

The ratio of the average particle diameter of the particles the surface of which is the silicone resin to the average thickness of the adhesive layer is not particularly limited, can be appropriately selected according to the purpose, and the ratio of the average particle diameter of the particles to the average thickness of the adhesive layer represented by [volume average particle diameter of particles/average thickness of adhesive layer] is preferably 5/100 or more, more preferably 5/100 to 95/100, even more preferably 10/100 to 75/100, and particularly preferably 20/100 to 60/100. In a case where the ratio is 5/100 or more, cavities are likely to be formed at the interface between the adhesive resin and the particles the surface of which is the silicone resin when a drop impact force is applied, and coarse particles are less likely to exist, thereby improving drop impact resistance. In addition, in the adhesive tape of the second aspect, it is possible to more easily and rapidly peel the adhesive tape off, and even in a case where the thickness of the base material of the adhesive tape is thin, the adhesive tape is not likely to be torn. In addition, in a case where the ratio is 95/100 or less, it is advantageous that more excellent adhesive performance such as drop impact resistance, impact resistance, shear adhesive strength, and split adhesive strength, and the like are obtained.

The content of the particles the surface of which is the silicone resin in the adhesive layer is 3 to 50 parts by mass, preferably 5 to 40 parts by mass, and more preferably 7 to 35 parts by mass with respect to 100 parts by mass of the adhesive resin. In a case where the content of the particles with respect to 100 parts by mass of the adhesive resin is 3 parts by mass or more, the particles are dispersed and exist in the adhesive layer, and when a drop impact is received, cavities are likely to be formed at the interface between the adhesive composition and the particles the surface of which is silicone resin, and peeling from the adherend and breaking of the adhesive layer can be suppressed. In addition, in the adhesive tape of the second aspect, the adhesive tape can be peeled off more easily and more rapidly. On the other hand, when the content of the particles with respect to 100 parts by mass of the adhesive resin is 50 parts by mass or less, it is possible to suppress the residual adhesive composition on the adherend. In addition, it is possible to suppress a decrease in drop impact resistance and impact resistance, and a decrease in adhesive strength such as shear adhesive strength and split adhesive strength. The content of the particles in the adhesive layer can be appropriately prepared when preparing the adhesive composition.

The volume ratio of the particles surface of which is silicone resin, to the volume of the entire adhesive layer is preferably 5% to 50%, more preferably 10% to 50%, even more preferably 15% to 50%, and most preferably 20% to 50%. In a case where the volume ratio of the particles is 5% or more, a cavity is easily formed at the interface between the adhesive resin and the surface and the particles which are silicone resins in a case where a drop impact is received, and the peeling off from the adherend and the breaking of the adhesive layer can be suppressed. In addition, in the adhesive tape of the second aspect, the adhesive tape can be peeled off more easily and more rapidly. On the other hand, in a case where the volume ratio of the particles is 50% or less, the adhesive composition can be suppressed from remaining on the adherend. In addition, it is possible to suppress a decrease in drop impact resistance and impact resistance, and a decrease in adhesive strength such as shear adhesive strength and split adhesive strength.

The volume ratio of the particles to the adhesive layer can be calculated from Equations (1) to (3).

$$\text{Mass } A \text{ of adhesive resin}^{*1} \text{ (g)/Density } A \text{ of adhesive resin}^{*1} \text{ (g/cm}^3\text{)=Volume } A \text{ of adhesive resin}^{*1} \text{ (cm}^3\text{)} \quad \text{Equation (1)}$$

$$\text{Particle mass } B \text{ (g)/particle density } B \text{ (g/cm3)=particle volume } B \text{ (cm}^3\text{)} \quad \text{Equation (2)}$$

$$\text{Volume } B \text{ of particles (cm}^3\text{)/(volume } A \text{ of adhesive resin}^{*1} \text{ (cm}^3\text{)+volume } B \text{ of particles (cm}^3\text{))} \times 100 = \text{volume ratio of particles(\%)} \quad \text{Equation (3)}$$

The adhesive resin represented by *[1] in Equations (1) and (3) may contain other components which will be described later.

The density is a value measured according to JIS Z 8804.

——Adhesive Resin——

The adhesive resin is not particularly limited and can be appropriately selected from well-known materials, and examples thereof include an acrylic-based adhesive resin, a rubber-based adhesive resin, a urethane-based adhesive resin, and the like. These may be used alone or in a combination of two or more thereof. Among these, as the adhesive resin, an acrylic-based adhesive resin or a rubber-based adhesive resin is preferable from the viewpoint of obtaining highly reliable adhesive strength.

——Acrylic-Based Adhesive Resin——

The acrylic-based adhesive resin is not particularly limited and can be appropriately selected according to the purpose, and for example, a resin containing an acrylic polymer and, if necessary, an additive such as a tackifier resin or a crosslinking agent, and the like is used.

The acrylic polymer can be produced, for example, by polymerizing a (meth)acrylate monomer.

As the (meth)acrylate monomer, for example, an alkyl (meth)acrylate having an alkyl group having 1 to 12 carbon atoms can be used.

Specific examples of the alkyl (meth)acrylate having an alkyl group having 1 to 12 carbon atoms include methyl (meth)acrylate, ethyl (meth)acrylate, n-butyl (meth)acrylate, isobutyl (meth)acrylate, t-butyl (meth)acrylate, n-hexyl (meth)acrylate, n-octyl (meth)acrylate, isooctyl (meth)acrylate, isononyl (meth)acrylate, cyclohexyl (meth)acrylate, 2-ethylhexyl (meth)acrylate, and the like. These may be used alone or in a combination of two or more thereof.

As the alkyl (meth)acrylate having an alkyl group having 1 to 12 carbon atoms, it is preferable to use an alkyl (meth)acrylate having an alkyl group having 4 to 12 carbon atoms, it is more preferable to use alkyl (meth)acrylate having an alkyl group having 4 to 8 carbon atoms, and it is particularly preferable to use n-butyl acrylate, in order to ensure excellent adhesiveness to the adherend.

The used amount of alkyl (meth)acrylate having an alkyl group having 1 to 12 carbon atoms is preferably 80% to 98.5% by mass and more preferably 90% to 98.5% by mass with respect to the total amount of the monomer used for producing the acrylic polymer.

As the monomer that can be used for producing the acrylic polymer, a highly polar vinyl monomer can be used, if necessary, in addition to the components described above.

Examples of the highly polar vinyl monomer include a (meth)acrylic monomer such as a (meth)acrylic monomer having a hydroxyl group, a (meth)acrylic monomer having a carboxyl group, and a (meth)acrylic monomer having an amide group, vinyl acetate, ethylene oxide-modified succinic acid acrylate, and a sulfonic acid group-containing monomer such as 2-acrylamide-2-methylpropansulfonate. These may be used alone or in a combination of two or more thereof.

Specific examples of the vinyl monomer having a hydroxyl group include (meth)acrylic monomers such as 2-hydroxyethyl (meth)acrylate, 2-hydroxypropyl (meth) acrylate, 4-hydroxybutyl (meth)acrylate, 6-hydroxyhexyl (meth)acrylate, and the like.

The vinyl monomer having a hydroxyl group is preferably used in a case of using an adhesive resin containing an isocyanate-based crosslinking agent. Specifically, as the vinyl monomer having a hydroxyl group, 2-hydroxyethyl (meth)acrylate, 4-hydroxybutyl (meth)acrylate, and 6-hydroxyhexyl (meth)acrylate are preferably used.

The used amount of the vinyl monomer having a hydroxyl group is preferably 0.01% to 1.0% by mass and more preferably 0.03% to 0.3% by mass with respect to the total amount of the monomer used for producing the acrylic polymer.

Specific examples of the vinyl monomer having a carboxyl group include (meth)acrylic monomers such as acrylate, methacrylate, itaconic acid, maleic acid, (meth)acrylic acid dimer, crotonic acid, ethylene oxide-modified succinic acid acrylate, and the like. Among these, acrylic acid is preferable.

Specific examples of the vinyl monomer having an amide group include (meth)acrylic monomers such as N-vinylpyrrolidone, N-vinylcaprolactam, acryloylmorpholine, acrylamide, N,N-dimethylacrylamide, and the like.

The used amount of the highly polar vinyl monomer is preferably 1.5% by mass to 20% by mass and more preferably 1.5% by mass to 10% by mass with respect to the total amount of the monomer used for producing the acrylic polymer, and the used amount thereof is even more preferably 2% by mass to 8% by mass because it is possible to form an adhesive layer having a good balance in terms of cohesive force, holding power and adhesiveness.

A method for producing the acrylic polymer is not particularly limited, and can be appropriately selected from well-known methods according to the purpose, and examples thereof include methods for polymerizing the monomer by a polymerization method such as a solution polymerization method, a bulk polymerization method, a suspension polymerization method, and an emulsion polymerization method. Among these, the acrylic polymer is preferably produced by the solution polymerization method or the bulk polymerization method.

In the case of polymerization, if necessary, a peroxide-based thermal polymerization initiator such as benzoyl peroxide or lauroyl peroxide, an azo thermal polymerization initiator such as azobisisobutylnitrile or the like, an acetophenone-based photopolymerization initiator, a benzoin ether-based photopolymerization initiator, a benzyl ketal-based photopolymerization initiator, an acylphosphine oxide-based photopolymerization initiator, a benzoin-based photopolymerization initiator, a benzophenone-based photopolymerization initiator, and the like can be used.

As the weight average molecular weight of the acrylic polymer obtained by the method, a weight average molecular weight measured in terms of standard polystyrene using a gel permeation chromatograph (GPC) is preferably 300,000 to 3,000,000 and more preferably 500,000 to 2,500,000.

Here, the measurement of the weight average molecular weight of the acrylic polymer by the GPC method is a standard polystyrene conversion value measured by using a GPC apparatus (HLC-8329GPC, manufactured by Tosoh Corporation), and the measurement conditions are as follows.

[Measurement Condition]
Sample concentration: 0.5% by mass (tetrahydrofuran (THF) solution)
Sample injection amount: 100 µL
Eluent: THF
Flow rate: 1.0 mL/min
Measurement temperature: 40° C.
Main column: two TSKgel GMHHR-H (20)
Guard column: TSKgel HXL-H
Detector: Differential refractometer
Standard polystyrene molecular weight: 10,000 to 20,000,000 (manufactured by Tosoh Corporation)

As the acrylic-based adhesive resin, it is preferable to use a resin containing a tackifier resin in order to improve the adhesiveness to the adherend and the surface adhesive strength.

The tackifier resin contained in the acrylic-based adhesive resin is not particularly limited and can be appropriately selected according to the purpose, and a tackifier resin having a softening point of 30° C. to 180° C. is preferable, and a tackifier resin having a softening point of 70° C. to 140° C. is more preferable for forming the adhesive layer having high adhesive performance. In a case of using the (meth)acrylate-based tackifier resin, the glass transition temperature thereof is preferably 30° C. to 200° C. and more preferably 50° C. to 160° C.

Specific examples of the tackifier resin contained in the acrylic-based adhesive resin include a rosin-based tackifier resin, a polymerized rosin-based tackifier resin, a polymerized rosin ester-based tackifier resin, a rosinphenol-based tackifier resin, a stabilized rosin ester-based tackifier resin, a disproportionation rosin ester-based tackifier resin, a hydrogenated rosin ester-based tackifier resin, a terpene-based tackifier resin, a terpene phenol-based tackifier resin, a petroleum resin-based tackifier resin, a (meth)acrylate-based tackifier resin, and the like. These may be used alone or in a combination of two or more thereof. Among these, the tackifier resin is preferably the polymerized rosin ester-based tackifier resin, the rosinphenol-based tackifier resin, the disproportionation rosin ester-based tackifier resin, the hydrogenated rosin ester-based tackifier resin, the terpenphenol-based resin, and the (meth)acrylate-based resin.

The amount of the tackifier resin used is not particularly limited, can be appropriately selected according to the purpose, and is preferably 5 parts by mass to 65 parts by mass with respect to 100 parts by mass of the acrylic polymer, and more preferably 8 parts by mass to 55 parts by mass, because it is easy to ensure the adhesiveness to the adherend.

As the acrylic-based adhesive resin, it is preferable to use a resin containing a crosslinking agent in order to further improve the cohesive force of the adhesive layer.

The crosslinking agent is not particularly limited and can be appropriately selected according to the purpose, and examples thereof include an isocyanate-based crosslinking agent, an epoxy-based crosslinking agent, a metal chelate-based crosslinking agent, an aziridine-based crosslinking agent, and the like. These may be used alone or in a combination of two or more thereof. Among these, as the crosslinking agent, a type of crosslinking agent which is mixed after producing the acrylic polymer to promote a crosslinking reaction is preferable, and an isocyanate-based crosslinking agent and an epoxy-based crosslinking agent having high reactivity with the acrylic polymer is more preferably used.

Examples of the isocyanate-based crosslinking agent include tolylene diisocyanate, triphenylmethane isocyanate, naphthylene-1,5-diisocyanate, hexamethylene diisocyanate, diphenylmethane diisocyanate, xylylene diisocyanate, trimethylol propan-modified tolylene diisocyanate, and the like. These may be used alone or in a combination of two or more thereof. Among these, tolylene diisocyanate, which is a trifunctional polyisocyanate compound, trimethylol propan adduct thereof, and triphenylmethane isocyanate are particularly preferable.

As an index of a degree of crosslinking, a value of a gel fraction for measuring an insoluble content after immersing the adhesive layer in toluene for 24 hours is used. The gel fraction of the adhesive layer is not particularly limited, can be appropriately selected according to the purpose, and is preferably 10% by mass to 70% by mass, more preferably 25% by mass to 65% by mass, and even more preferably 35% by mass to 60% by mass for obtaining an adhesive layer having excellent cohesiveness and adhesiveness.

The gel fraction refers to a value measured by the following method. An adhesive composition is applied onto a peeling sheet so that a thickness after drying becomes 50 μm, dried at 100° C. for 3 minutes, aged at 40° C. for 2 days, and cut into 50 mm square, and this is used as a sample. Next, a mass (G1) of the sample before immersion in toluene is measured in advance, a toluene-insoluble content of the sample after being immersed in the toluene solution at 23° C. for 24 hours is separated by filtering with a 300 mesh wire net, a mass (G2) of a residue after drying at 110° C. for 1 hour is measured, and the gel fraction is obtained according to Equation (4). A mass (G3) of the particles the surface of which is silicone resin in the sample is calculated from the mass (G1) of the sample and the composition of the adhesive composition.

$$\text{Gel fraction (\% by mass)} = (G2-G3)/(G1-G3) \times 100 \quad \text{Equation (4)}$$

——Rubber-Based Adhesive Resin——

The rubber-based adhesive resin is not particularly limited, and a resin containing a rubber material that can be generally used as an adhesive resin such as a synthetic rubber-based adhesive resin or a natural rubber-based adhesive resin, and, if necessary, an additive such as the tackifier resin is used.

Examples of the rubber material include a block copolymer of an aromatic vinyl compound and a conjugated diene compound, specifically, a styrene-based resin such as a styrene-isoprene copolymer, a styrene-isoprene-styrene copolymer, a styrene-isoprene-butadiene-styrene copolymer, a styrene-butadiene-styrene copolymer, a styrene-ethylene-butylene copolymer, a styrene-ethylene-propylene copolymer, and a hydrogenated product thereof. These may be used alone or in a combination of two or more thereof. Among these, it is more preferable to use two or more kinds of styrene-based resins in combination because they can give excellent adhesive properties and holding power to the adhesive tape, and it is particularly preferable to use both the styrene-isoprene copolymer and the styrene-isoprene-styrene copolymer in combination.

As the styrene-based resin, for example, a styrene-based resin having a single structure of a linear structure, a branched structure, or a multi-branched structure may be used, or a mixture of different structures may be used. In a case where a styrene-based resin having abundant linear structure is used for the adhesive layer, excellent adhesive performance can be imparted to the adhesive tape. On the other hand, the styrene-based resin having a branched structure or a multi-branched structure in which a styrene block is arranged at a molecular terminal can have a pseudo-crosslinked structure and can impart excellent cohesive force, and accordingly, it is possible to impart high holding power. Therefore, it is preferable to mix and use the styrene-based resin according to the required characteristics.

As the styrene-based resin, the structural unit represented by Chemical Formula (2) with respect to the total mass of the styrene-based resin is preferably 10% by mass to 80% by mass, more preferably 12% by mass to 60% by mass, even more preferably 15% by mass to 40% by mass, and particularly preferably 17% by mass to 35% by mass. Thereby, excellent adhesiveness and heat resistance can be obtained.

[Chem. 2]

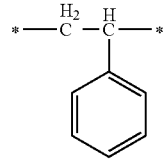

(2)

In a case where the styrene-isoprene copolymer and the styrene-isoprene-styrene copolymer are used in combination as the styrene-based resin, the content of the styrene-isoprene copolymer with respect to the total mass of the styrene-isoprene copolymer and the styrene-isoprene-styrene copolymer is preferably 0% by mass to 80% by mass, more preferably 0% by mass to 77% by mass, even more preferably 0% by mass to 75% by mass, and particularly preferably 0% by mass to 70% by mass. In a case where the content of the styrene-isoprene copolymer is within the preferable range, it is possible to achieve both excellent adhesive performance and thermal durability for the adhesive tape.

In addition, as the styrene-isoprene copolymer, it is preferable to use a styrene-isoprene copolymer having the weight average molecular weight measured in terms of standard polystyrene using the gel permeation chromatograph (GPC) of 10,000 to 800,000, it is more preferable to use a styrene-isoprene copolymer having the weight average molecular weight of 30,000 to 500,000, and it is even more preferable to use the styrene-isoprene copolymer having the weight average molecular weight of 50,000 to 300,000. In a case where the weight average molecular weight of the styrene-isoprene copolymer is within the preferable range, heat fluidity and compatibility during solvent dilution can be ensured, so that the workability in the production step is excellent and it is possible to obtain an adhesive tape having thermal durability.

Here, the measurement of the weight average molecular weight of the styrene-isoprene copolymer by the GPC method is a standard polystyrene conversion value measured by using a GPC apparatus (SC-8020, manufactured by Tosoh Corporation), and the measurement conditions are as follows.

—Measurement Conditions—

Sample concentration: 0.5% by mass (tetrahydrofuran solution)
Sample injection amount: 100 μL
Eluent: Tetrahydrofuran
Flow rate: 1.0 mL/min
Measurement temperature: 40° C.
Main column: two TSKgel (registered trademark) GMHHR-H (20)
Guard column: TSKgel HXL-H
Detector: Differential refractometer
Standard polystyrene molecular weight: 10,000 to 20,000,000 (manufactured by Tosoh Corporation)

The method for producing the styrene-based resin is not particularly limited and can be appropriately selected from well-known production methods of the related art. A block copolymer is obtained by the anion living polymerization method, a coupling agent is added if necessary, a reaction is allowed, and thereby obtaining a styrene-based resin.

Specifically, the method for producing the styrene-isoprene copolymer is not particularly limited and can be appropriately selected from well-known production methods of the related art, and for example, a method for sequentially polymerizing a styrene block and an isoprene block by the anion living polymerization method is used.

The method for producing the styrene-isoprene-styrene copolymer is not particularly limited and can be appropriately selected from well-known production methods of the related art, and examples thereof include a method for sequentially polymerizing a styrene block and an isoprene block by the anion living polymerization method, a method for producing a block copolymer having a living active terminal, and allowing a reaction with a coupling agent to produce a coupled block copolymer, and the like.

The method for producing a mixture of the styrene-isoprene copolymer and the styrene-isoprene-styrene copolymer is not particularly limited and can be appropriately selected from well-known production methods of the related art, and for example, a method for mixing the styrene-isoprene copolymer and the styrene-isoprene-styrene copolymer produced in the method is used.

In addition, as a method for producing the mixture of the styrene-isoprene copolymer and the styrene-isoprene-styrene copolymer, it is also possible to produce the mixture as a mixture at the same time in one polymerization step.

As a more specific embodiment, by the anion living polymerization method, first, a styrene monomer is polymerized in a polymerization solvent using an anionic polymerization initiator to form a polystyrene block having a living active terminal. Second, isoprene is polymerized from the living active terminal of the polystyrene block to obtain a styrene-isoprene diblock copolymer having a living active terminal. Third, a part of the styrene-isoprene diblock copolymer having a living active terminal is reacted with the coupling agent to form a coupled styrene-isoprene-styrene block copolymer. Fourth, the residue of the styrene-isoprene diblock copolymer having a living active terminal is deactivated by using a polymerization inhibitor to deactivate the living active terminal to form a styrene-isoprene diblock copolymer.

The tackifier resin contained in the rubber-based adhesive resin is not particularly limited and can be appropriately selected according to the purpose, and it is preferable to use a tackifier resin having a softening point of 80° C. or higher. Therefore, it is possible to obtain an adhesive tape having excellent initial adhesiveness and thermal durability.

The tackifier resin is preferably solid at room temperature (23° C.), and specific examples thereof include a petroleum resin such as a C5 series petroleum resin, a C9 series petroleum resin, a C5 series/C9 series petroleum resin, or an alicyclic-based petroleum resin, a polymerized rosin-based resin, a terpene-based resin, a rosin-based resin, a terpene-phenol resin, a styrene resin, a coumarone indene resin, a xylene resin, and a phenolic resin. These may be used alone or in a combination of two or more thereof. Among these, it is preferable to use the C5 series petroleum resin and the polymerized rosin-based resin in combination as the tackifier resin in order to achieve both excellent initial adhesiveness and thermal durability.

The petroleum resin is easily compatible with the structural unit represented by Chemical Formula (1) constituting the styrene-based resin, and as a result, it is possible to further improve the initial adhesive strength and thermal durability of the adhesive tape.

Examples of the C5 series petroleum resin include Escorez 1202, Escorez 1304, Escorez 1401 (all manufactured by Exxon Mobil Corporation), Wingtack 95 (manufactured by The Goodyear Tire & Rubber Company), Quinton K100, and Quinton R100, Quinton F100 (all manufactured by Zeon Corporation), Picotack 95, and Pico-Pale 100 (manufactured by Rika Hercules Co., Ltd.).

Examples of the C9 series petroleum resin include Nisseki Neopolymer L-90, Nisseki Neopolymer 120, Nisseki Neopolymer 130, Nisseki Neopolymer 140, Nisseki Neopolymer 150, Nisseki Neopolymer 170S, Nisseki Neopolymer 160, Nisseki Neopolymer E-100, Nisseki Neopolymer E-130, Nisseki Neopolymer 130S, and Nisseki Neopolymer S (all manufactured by ENEOS Corporation), Petcol (registered trademark) (Manufactured by Tosoh Corporation), and the like.

As the C5 series/C9 series petroleum resin, a copolymer of C5 series petroleum resin and C9 series petroleum resin can be used, and for example, Escorez 2101 (manufactured by Exxon Mobil Corporation), Quinton G115 (manufactured by Zeon Corporation), Hercotac 1149 (manufactured by Rika Hercules Co., Ltd.), and the like can be used.

The alicyclic-based petroleum resin can be obtained by hydrogenating C9 series petroleum resin, and examples thereof include Escorez 5300 (manufactured by Exxon Mobil Corporation), Archon P-100 (manufactured by Arakawa Chemical Industries, Ltd.), Rigalite R101. (Manufactured by Rika Hercules Co., Ltd.), and the like.

The amount of the tackifier resin used is not particularly limited, can be appropriately selected according to the purpose, and is 0% by mass to 100% by mass, more preferably 0% by mass to 70% by mass, even more preferably 0% by mass to 50% by mass, and particularly preferably 0% by mass to 30% by mass, with respect to the total amount of the components constituting the rubber-based adhesive resin. By using the tackifier resin within the preferable range, it is easy to achieve both excellent breaking elongation and thermal durability of the adhesive tape while increasing interfacial adhesiveness between the adhesive layer and the base material layer. In addition, by using the tackifier resin within the above preferable range, it is possible to improve the adhesive strength while maintaining excellent drop impact resistance.

The used amount of the tackifier resin having a softening point of 80° C. or higher is not particularly limited, can be appropriately selected according to the purpose, and is preferably 3% by mass to 100% by mass, more preferably 5% by mass to 80% by mass, and particularly preferably 5% by mass to 80% by mass with respect to the total amount of the styrene-based resin, when obtaining an adhesive tape achieving both more excellent adhesiveness and excellent thermal durability.

In addition, in order to obtain adhesiveness and initial adhesiveness in a constant temperature environment, a tackifier resin having a softening point of −5° C. or lower can also be used in combination with a tackifier resin having a softening point of 80° C. or higher.

The tackifier resin having a softening point of −5° C. or lower is not particularly limited and can be appropriately selected from well-known tackifier resins according to the purpose, and it is preferable to use a liquid tackifier resin at room temperature.

Specific examples of the tackifier resin having a softening point of −5° C. or lower include liquid rubber such as process oil, polyester, polybutene, and the like. These may be used alone or in a combination of two or more thereof. Among these, it is preferable to use polybutene for the tackifier resin having a softening point of −5° C. or lower in order to exhibit further excellent initial adhesiveness.

The used amount of the tackifier resin having a softening point of −5° C. or lower is preferably 0% by mass to 40% by mass and more preferably 0% by mass to 30% by mass with respect to the total amount of the tackifier resin.

The used amount of the tackifier resin having a softening point of −5° C. or lower is preferably 0% by mass to 40% by mass with respect to the total amount of the styrene-based resin, and more preferably 0% by mass to 30% by mass, because it is possible to perform excellent adhesion by improving the initial adhesive strength, and obtain sufficient thermal durability.

The mass ratio of the tackifier resin having a softening point of 80° C. or higher to the tackifier resin having a softening point of −5° C. or lower is not particularly limited, can be appropriately selected according to the purpose, and the mass ratio of the tackifier resin having a softening point of 80° C. or higher to the tackifier resin having a softening point of −5° C. or lower represented by [mass of the tackifier resin having a softening point of 80° C. or higher/mass of the tackifier resin having a softening point of −5° C. or lower] is preferably 5 to 50, and more preferably 10 to 30 when obtaining an adhesive tape achieving both excellent initial adhesiveness and excellent holding power.

The mass ratio of the styrene-based resin to the tackifier resin is not particularly limited and can be appropriately selected according to the purpose, and the mass ratio of the styrene-based resin to the tackifier resin represented by [styrene-based resin/tackifier resin] is preferably 0.5 to 10.0 and more preferably 0.6 to 9.0, because it is possible to improve initial adhesive strength and obtain excellent thermal durability. In addition, the mass ratio [styrene-based resin/tackifier resin] is preferably larger than 1, for example, to prevent peeling due to the repulsive force of the adhesive tape when it is attached to a curved surface portion of the adherend (repulsion resistance).

——Urethane-Based Adhesive Resin (Urethane-Based Polymer)——

The urethane-based adhesive resin refers to an adhesive resin containing a urethane-based polymer as a base polymer. The urethane-based adhesive resin is typically formed of a urethane-based resin containing a urethane-based polymer obtained by reacting polyol and a polyisocyanate compound as a base polymer, and if necessary, an additive such as a tackifier resin or the like is contained. The urethane-based polymer is not particularly limited, and an appropriate urethane-based polymer from various urethane-based polymers that can function as the adhesive (ether-based polyurethane, ester-based polyurethane, carbonate-based polyurethane, and the like) can be used. Examples of the polyol include polyether polyol, polyester polyol, polycarbonate polyol, polycaprolactone polyol, and the like. Examples of the polyisocyanate compound include diphenylmethane diisocyanate, tolylene diisocyanate, hexamethylene diisocyanate, and the like. As the tackifier resin that can be contained in the urethane-based adhesive resin, the tackifier resins exemplified for the acrylic-based adhesive resin or the styrene-based adhesive resin can be used.

——Other Components——

The other components in the adhesive layer are not particularly limited and can be appropriately selected as long as the characteristics of the adhesive tape are not impaired, and examples thereof include a polymer component other than the adhesive resin; an additive such as a crosslinking agent, an anti-aging agent, a UV absorber, a filler, a polymerization inhibitor, a surface modifier, an antistatic agent, a defoaming agent, a viscosity modifier, a light-resistant stabilizer, a weathering stabilizer, a heat-resistant stabilizer, an antioxidant, a leveling agent, an organic pigment, an inorganic pigment, a pigment dispersant, a plasticizer, a softener, a flame retardant, a metal deactivator, silica beads, or organic beads; an inorganic filler such as silicon oxide, aluminum oxide, titanium oxide, zirconia, and antimony pentoxide. These may be used alone or in a combination of two or more thereof.

The content of other components in the adhesive layer can be appropriately selected as long as the characteristics of the adhesive tape are not impaired.

The adhesive composition forming the adhesive layer may contain a crosslinking agent, if necessary, in addition to the adhesive resin described above. This is because the cohesive force of the adhesive layer can be increased by containing the crosslinking agent. The kind of the crosslinking agent is not particularly limited, and a well-known crosslinking agent of the related art can be appropriately selected and used. Examples of such a crosslinking agent include an isocyanate-based crosslinking agent, an epoxy-based crosslinking agent, an oxazoline-based crosslinking agent, an aziridine-based crosslinking agent, a melamine-based crosslinking agent, a peroxide-based crosslinking agent, a metal chelate-based crosslinking agent, and the like. The crosslinking agent may be used alone or in a combination of two or more thereof. Among these, from a viewpoint of improving the cohesive force, it is preferable to use an isocyanate-based crosslinking agent and an epoxy-based crosslinking agent. The specific isocyanate-based crosslinking agent is as described above. The amount of the crosslinking agent used is not particularly limited, and can be selected from 10 parts by mass or less, for example, approximately 0.005 to 10 parts by mass, and preferably approximately 0.01 to 5 parts by mass with respect to 100 parts by mass of the adhesive resin.

The adhesive composition for forming the adhesive layer may be foamable or may be in a foamed state. For this purpose, the adhesive composition can be provided with a foaming agent in the formulation. As the foaming agent, an expanded or expandable microballoon can be used. However, the chemical foamable agents can be used alone or in combination with other foaming agents. In addition, the adhesive composition may foam or may be foamed physically, that is, by blending a gaseous or supercritical liquid substance or substance mixture. It is preferable that the foaming is carried out by blending a microballoon and then expanding it as means for foaming.

The "microballoon" is understood to be a micro hollow beads having elasticity with an expandable thermoplastic polymer shell. These beads are filled with a liquid or a liquefied gas having a low boiling point. As the shell material, particularly, polyacrylonitrile, PVDC, PVC, or polyacrylate is used. As the liquid having a low boiling point, particularly, low alkane hydrocarbon, for example, isobutane or isopentane is suitable, and these are sealed in a polymer shell under pressure as a liquefied gas.

In particular, by acting on the microballoons by the action of heat, the outer polymer shell is softened, and at the same time, the liquid foaming agent gas existing in the shell is changed to a gaseous state. At this time, the microballoon expands three-dimensionally and irreversibly. When the internal pressure and the external pressure become equal, the expansion terminals and the polymer shell is maintained, so that a closed cell type foam is obtained.

A wide variety of microballoons are commercially available and are distinguished by their size (diameter in the unexpanded state is 6 to 45 μm) and starting temperature required for their expansion (75 to 220° C.). An example of a commercially available microballoon is Akzo Nobel's Expancel (registered trademark) DU type (DU=dry unexpanded product).

The unexpanded microballoon is also available as a solid material or an aqueous dispersion liquid having a microballoon content of approximately 40% to 45% by mass, and is also available as a polymer bonding type microballoon (master batch), for example, a polymer bonding type microballoon having a microballoon concentration of approximately 65% by mass in ethyl vinyl acetate. Among these, Akzo Nobel's Expancel (registered trademark) DU type is preferably dispersed in the adhesive composition in terms of easiness of the production.

The foamed adhesive composition can also be generated using a so-called pre-expanding microballoon. In this category, it is possible to disperse microballoons that have already been expanded into the adhesive composition prior to inclusion in the polymer matrix. The pre-expanded microburn is commercially available, for example, under the name of Dualite (registered trademark) or as typology Expancel xxx DE (dry expanded product) manufactured by Akzo Nobel.

In a case where the adhesive composition contains a microballoon, at least 90% of the total hollow space formed by the microballoon in the adhesive layer has a maximum diameter of preferably 20 to 75 μm and more preferably 25 to 65 μm. The "maximum diameter" is understood to be a maximum elongation of the microballoon in any spatial direction.

The diameter is determined at a magnification of 500 times with a scanning electron microscope based on the freezing fracture edge. It is possible to plot the diameter from each of the individual microballoons.

When foaming using microballoons, the microballoons can be supplied to the formulation as batches, pastes. In addition, the microballoon can be present in a state of being suspended in a solvent.

The proportion of the microballoon in the adhesive composition is preferably 0.5% by mass to 2.5% by mass and more preferably 1.0% by mass to 2.0% by mass, based on the entire adhesive composition. The above numerical value is a value of unexpanded microballoon.

The adhesive composition may additionally contain non-expandable micro-hollow beads in addition to particles the surface of which is the silicone resin and expandable micro-hollow beads. For the micro-hollow beads, it is only necessary that substantially all cavities containing gas are permanently closed by a dense film, and it does not matter whether a shell film is formed of only an elastic and thermoplastic elongation polymer mixture or formed of an elastic and non-thermoplastic (in a range of a temperature possible plastic processing) glass.

Examples of other beads that can be contained in the adhesive composition include polymer solid beads, glass hollow beads, glass solid beads, ceramic hollow beads, ceramic solid beads, and/or carbon solid beads ("carbon microballoon").

The relative density of the adhesive composition when foamed is preferably 450 to 950 kg/m$^3$ and preferably 600 to 800 kg/m$^3$.

The relative density indicates a ratio of the density of the foamed adhesive composition to the density of the unfoamed adhesive composition of the same formulation. The relative density of the adhesive composition is preferably 0.20 to 0.99, more preferably 0.30 to 0.90, and particularly preferably 0.50 to 0.85.

(Adhesive Composition)

The adhesive layer can be formed by using an adhesive such as a water-based adhesive, a solvent-type adhesive, a hot-melt type adhesive, and an active energy ray-curable adhesive containing the adhesive composition. The water-based adhesive refers to a form in which the adhesive composition (adhesive layer-forming component) is contained in a solvent containing water as a main component (water-based solvent), and typically includes adhesives called a water-dispersible adhesive (form in which at least some of the adhesive composition are dispersed in water), and the like. In addition, the solvent-type adhesive refers to a form in which the adhesive composition is contained in an organic solvent. The adhesive layer in the adhesive tape of the present embodiment is preferably formed by using the solvent-type adhesive, from a viewpoint of preferably achieving the adhesive properties such as the shear adhesive strength.

<Other Layers>

The adhesive tape of the present embodiment is not particularly limited, and other layers can also be appropriately provided according to the purpose, and examples thereof include a primer layer, an antistatic layer, a non-combustible layer, a decorative layer, a conductive layer, a heat conductive layer, a release layer, and the like.

<Shape, Characteristics, and the Like of Adhesive Tape>

According to the first aspect, the adhesive tape of the present embodiment may have only an adhesive layer, or may have an adhesive layer on one side of the base material layer, and may have adhesive layer on both sides of the base material layer. In addition, according to the second aspect, the structure may be such that the adhesive layer is provided on one side of the base material layer, or the adhesive layer may be provided on both sides of the base material layer, but a pair of adherends are fixed via an adhesive tape, it is preferable to have an adhesive layer on both sides of the base material layer.

The shape and dimensions of the adhesive tape of the present embodiment are not particularly limited, and examples thereof include an adhesive tape having a suitable shape and dimensions to be attached to a predetermined adherend (for example, punched adhesive tape) or a sheet-shaped long adhesive tape (for example, adhesive tape before being processed into a specific shape).

In addition, the adhesive tape of the present embodiment can be provided with a non-adhesive gripping region optionally, for example, to be attached to an adherend or peeled off from the adherend.

The thickness of the adhesive tape is not particularly limited and can be appropriately selected according to the layer configuration of the adhesive tape, thicknesses of the adhesive layer and the base material layer, and is preferably 15 μm to 800 μm, more preferably 30 μm to 540 μm, even more preferably 60 μm to 320 μm, particularly preferably 70 μm to 250 μm.

In the present specification, the "thickness of the adhesive tape" means an average value of the thicknesses measured at 25 points by cutting the adhesive tape at 5 places in the length direction at 100 mm intervals and measuring the thickness of the adhesive layer at 5 points at 100 mm intervals in the width direction on each cut surface using a TH-104 paper/film thickness measuring machine (manufactured by Tester Sangyo Co., Ltd.).

In a case where the adhesive tape of the present embodiment includes the base material layer, the hardness of the adhesive tape (type A hardness (shore A hardness)) is not particularly limited and can be appropriately selected according to the purpose, and is preferably 10 to 100, more preferably 20 to 85, and even more preferably 64 to 85. In a case where the shore A hardness of the adhesive tape having the base material layer is within the preferable range, the drop impact resistance becomes high. In addition, even when the adhesive tape is elongated and peeled off, the re-peeling operation by peeling off the adhesive tape becomes easy. On the other hand, if the Shore A hardness is less than 10, the adhesive tape may be broken because it cannot withstand the impact force. In addition, the adhesive tape may be torn when it is elongated and peeled off. On the other hand, if the shore A hardness of the adhesive tape having the base material layer exceeds 100, it may be peeled off at the interface between the adhesive tape and the adherend due to the impact force. In addition, when the adhesive tape is elongated and tried to be re-peeled off, the stress for elongating may become too high and the adhesive tape may not be re-peeled off.

The rubber hardness of the adhesive tape is Shore A hardness and indicates a value measured based on JIS K6253 using a durometer (spring type rubber hardness tester) (model name: GS-719G, manufactured by TECLOCK Co., Ltd.).

The stress at 25% elongation of the adhesive tape is preferably 0.15 MPa to 82 MPa, more preferably 0.15 MPa to 10 MPa, even more preferably 0.15 MPa to 5 MPa, and most preferably 0.15 MPa to 3 MPa. When the stress at 25% elongation of the adhesive tape is 0.15 MPa to 82 MPa, it is possible to obtain an adhesive strength suitable for the adhesive tape.

In addition, even when the adhesive tape is peeled off (elongated and peeled off), it can be peeled off comparatively easily. On the other hand, in a case where the stress at 25% elongation of the adhesive tape is less than 0.15 MPa, the adhesive strength may be insufficient, and the adhesive tape may be peeled off, when a load is generated in the shear direction of the adhesive tape while fixing hard adherends. On the other hand, if the stress at 25% elongation of the adhesive tape exceeds 82 MPa, the adhesive tape may not be easily displaced by the impact force and it may be difficult to obtain drop impact resistance, and when the adhesive tape is peeled off, the force required to elongate the adhesive tape tends to be excessive.

The stress at 25% elongation of the adhesive tape indicates a stress value measured, in a case where the adhesive tape is punched into a dumbbell shape with a marked line length of 20 mm and a width of 5 mm, and pulled and elongated by 25% in a length direction at a tensile speed of 500 mm/min by using TENSILON tensile testing machine (model name: RTF-1210, manufactured by A & D Company, Limited) under conditions of a measurement atmosphere of 23° C. and 50% RH.

The breaking strength of the adhesive tape is not particularly limited and can be appropriately selected according to the purpose, and is preferably 10 MPa to 100.0 MPa, more preferably 15 MPa to 90.0 MPa, even more preferably 30 MPa to 90.0 MPa, and particularly preferably 40 MPa to 90.0 MPa. When the breaking strength of the adhesive tape is within the preferable range, it is possible to obtain a suitable adhesive strength while suppressing the adhesive tape from being broken by the impact force. In addition, it is possible to suppress the adhesive tape from being torn even when the adhesive tape is rapidly elongated and peeled off, and the load for elongating the adhesive tape does not excessively increase, and therefore the re-peeling operation by peeling is easily performed. On the other hand, in a case where the breaking strength of the adhesive tape is less than 10 MPa, the adhesive tape may be torn when the adhesive tape is rapidly elongated and peeled off, and in a case where the breaking strength thereof exceeds 100.0 MPa, the adhesive tape cannot be sufficiently elongated when attempting to elongate and re-peel the adhesive tape off, and accordingly, the re-peeling may not be performed. The force required to elongate and deform the adhesive tape depends even on a thickness of the adhesive tape. For example, even in a case where the adhesive tape is thick and the adhesive tape having high breaking strength is attempted to elongate to re-peel it off, the adhesive tape may not be sufficiently elongated and re-peeled off.

The breaking strength of the adhesive tape indicates a stress value measured, in a case where the adhesive tape is punched into a dumbbell shape with a marked line length of 20 mm and a width of 5 mm, and pulled and broken in a length direction at a tensile speed of 500 mm/min by using TENSILON tensile testing machine (model name: RTF-1210, manufactured by A & D Company, Limited) under conditions of a measurement atmosphere of 23° C. and 50% RH.

The breaking elongation of the adhesive tape is not particularly limited, can be appropriately selected according to the purpose, and is preferably 400% to 2,000%, more preferably 500% to 1,800%, and even more preferably 600% to 1,200%. In a case where the breaking elongation of the adhesive tape is 400% or more, even in a case where the adhesive tape is firmly adhered to the adherend, when re-peeling the adhesive tape, the stress for elongating it in a horizontal direction to a vertical direction with respect to the attachment surface of the adherend does not excessively increase, and the adhesive tape is not excessively elongated even when peeling off, thereby easily performing the peeling. In addition, in a case where the breaking elongation is 2,000% or less, when re-peeling the adhesive tape off, an elongation distance from the attachment surface of the adherend in the horizontal direction to the vertical direction does not excessively increase, and accordingly the operation can be performed in a small space. In a case where the breaking elongation excessively decreases, when re-peeling the adhesive tape off, the adhesive tape may not be peeled off due to the breaking when elongating and peeling the adhesive tape from the attachment surface of the adherend in the horizontal direction to the vertical direction, and in a case where the breaking elongation excessively increases, when re-peeling the adhesive tape, the elongation distance from the attachment surface of the adherend in the horizontal direction to the vertical direction excessively increases, thereby deteriorating workability.

The breaking elongation of the adhesive tape indicates a tensile elongation rate measured, in a case where the adhesive tape is punched into a dumbbell shape with a marked line length of 20 mm and a width of 5 mm, and pulled and broken in the length direction at the tensile speed of 500 mm/min by using TENSILON tensile testing machine (model name: RTF-1210, manufactured by A & D Company, Limited) under conditions of a measurement atmosphere of 23° C. and 50% RH.

Since the adhesive tape of the present embodiment has the predetermined adhesive layer in both the first aspect and the second aspect, it can exhibit excellent drop impact resistance. The drop impact resistance can be found, for example, by a method described in "Evaluation of drop impact resistance" in a section of examples which will be described later. In the evaluation of drop impact resistance, the height when the adhesive tape is peeled off is preferably 60 cm or more, more preferably 70 cm or more, and particularly preferably 80 cm or more.

Among the adhesive tape of the present embodiment, the adhesive tape of the second aspect can be peeled off even if it is pulled in a direction perpendicular to the attachment surface of the adherend (90° direction) under predetermined conditions. Specifically, the adhesive tape of the present embodiment is evaluated according to "evaluation of 90° elongation peeling (high speed)" described in a section of the examples which will be described later, and the result thereof may be "occurrence of cutting of the adhesive tape is 0 out of 3 times" or "occurrence of cutting of the adhesive tape was 1 out of 3 times and/or the area of the adhesive composition remaining on the adherend is less than 1/5 with respect to the initial attachment area". Since the adhesive tape has such physical properties, it is possible to more easily and rapidly remove it from the adherend.

The adhesive tape of this embodiment also has excellent impact resistance. The impact resistance can be found, for example, by a method described in "Evaluation of impact resistance" in a section of examples which will be described later. In the evaluation of impact resistance, a height of a striking core at which the adhesive tape is peeled off or broken can be appropriately selected as long as the effect of the present invention is not impaired, and it is preferably 30 cm or more, more preferably 40 cm or more, even more preferably 50 cm or more, and particularly preferably 60 cm or more. In a case where the height is less than 30 cm, sufficient impact resistance tends not to be obtained.

The 180° peeling adhesive strength of the adhesive tape is not particularly limited, can be appropriately selected according to the purpose, and is preferably 3 N/20 mm to 50 N/20 mm, more preferably 10 N/20 mm to 50 N/20 mm, and even more preferably 15 N/20 mm to 45 N/20 mm. In a case where the 180° peeling adhesive strength is within the preferable range, it is possible to easily peel the adhesive tape off when elongating and re-peeling the adhesive tape from the attachment surface of the adherend in the horizontal direction to the vertical direction, while having suitable adhesive strength without occurring peeling or displacement from the adherend.

The 180° peeling adhesive strength of the adhesive tape refers to a value measured based on JIS Z0237.

<Method for Producing Adhesive Tape>

In the present embodiment, the method for producing the adhesive tape is not particularly limited, and can be appropriately selected from well-known methods. The method for producing an adhesive tape having no base material layer includes at least an adhesive layer forming step. The method for producing an adhesive tape provided with the adhesive layer on one surface or both surfaces of the base material layer preferably includes an adhesive layer forming step, a base material layer forming step, and a laminating step, and further includes other layer forming steps, if necessary. In addition, the adhesive tape can also be produced by a multi-layer simultaneous forming step in which the adhesive layer forming step and the base material layer forming step are performed at the same time.

The adhesive layer forming step is not particularly limited as long as the adhesive layer can be formed, and can be appropriately selected according to the purpose, and for example, a method for forming an adhesive layer on a surface of a peeling sheet by a method such as a heat-press method, a casting method by extrusion molding, a uniaxial stretching method, a sequential secondary stretching method, a simultaneous biaxial stretching method, an inflation method, a tube method, a calendar method, and a solution method is used. Among these, the casting method by extrusion molding and the solution method are preferable.

The peeling sheet is not particularly limited and can be appropriately selected according to the purpose, and for example, paper such as kraft paper, glassine paper, and high-quality paper; a resin film such as polyethylene, polypropylene (biaxially stretched polypropylene (OPP), uniaxial stretched polypropylene (CPP)), or polyethylene terephthalate (PET); laminated paper in which the paper and the resin film are laminated, and paper in which a peeling process of a silicone-based resin or the like is performed on one surface or both surfaces of the sheet subjected to a filling process with clay or polyvinyl alcohol, and the like. These may be used alone or in a combination of two or more thereof.

The base material layer forming step is not particularly limited as long as the base material layer can be formed, and can be appropriately selected according to the purpose, and examples thereof include a heat-press method, a casting method by extrusion molding, a uniaxial stretching method, a sequential secondary stretching method, a simultaneous biaxial stretching method, an inflation method, a tube method, a calendar method, and a solution method is used. These methods may be used alone or in a combination of two or more thereof. Among these, the casting method by extrusion molding, the inflation method, the tube method, the calendar method, and the solution method are preferable in order to impart suitable flexibility and elongation property to the base material layer.

The base material layer may be surface-treated in order to further improve the adhesiveness with the adhesive layer.

The surface treatment method is not particularly limited and can be appropriately selected from well-known methods as long as the characteristics of the adhesive tape are not impaired. Examples thereof include a sandblast method, a surface polishing/friction method, a corona discharge treatment method, a chromic acid treatment method, a flame treatment method, a hot air treatment method, an ozone treatment method, an ultraviolet irradiation treatment method, and an oxidation treatment method.

The laminating step is a step of laminating the base material layer and the adhesive layer. The method for laminating the base material layer and the adhesive layer is not particularly limited and can be appropriately selected from well-known methods, and for example, a method for laminating by pressurizing the adhesive layer in a state of being attached to the peeling sheet formed in the adhesive layer forming step and the base material layer is used.

<Use of Adhesive Tape>

Adhesive tapes can be suitably used for fixing parts and temporarily fixing parts in various industrial fields such as fixing metal plates constituting a comparatively large electronic devices such as a flat screen TV, home equipment, OA devices, fixing of an exterior parts and a housing, and fixing of exterior parts or rigid parts of batteries to a comparatively small electronic devices such as a portable electronic terminal, a camera, a personal computer, labels displaying product information, and the like.

Hereinabove, the embodiment of the present invention has been described, but the adhesive tape of the present invention is not limited to the examples and can be appropriately modified.

EXAMPLES

Hereinafter, the present invention will be described in more detail with reference to the examples, and the present invention is not limited to the following examples.

The measurement and the evaluation of the adhesive tapes obtained in each example and comparative example were carried out based on the following method.

(1) Measurement of Breaking Strength and Breaking Elongation of Base Material Layer By punching each base material layer into a dumbbell shape with a marked line length of 20 mm and a width of 5 mm, and pulling it in a length direction at a tensile speed of 500 mm/min by using TENSILON tensile testing machine (model name: RTF-1210, manufactured by A & D Company, Limited) under conditions of a measurement atmosphere of 23° C. and 50% RH, the breaking strength and the breaking elongation of the base material layer were measured.

(2) Measurement of Rubber Hardness

The type A hardness (shore A) of each adhesive tape was measured based on JIS K6253 using a durometer (spring type rubber hardness tester) (model name: GS-719G, manufactured by TECLOCK Co., Ltd.).

(3) Measurement of the Thickness of the Base Material Layer and the Adhesive Layer The base material layer and the adhesive layer are cut at 5 places in the length direction at 100 mm intervals in the width direction, and the thickness of 5 points at 100 mm intervals in the width direction on each cut surface was measured using a thickness measuring machine for paper and film (manufactured by Tester Sangyo Co., Ltd.). The value obtained by averaging the thicknesses of the total of 25 points was taken as the thickness of the base material layer and the adhesive layer.

(4) Measurement of Particle Diameter

The average particle diameter of the particles was measured by using a measuring machine (microtrack) using a laser diffraction scattering method.

(5) Evaluation of 90° Elongation Peeling (High Speed)

Each adhesive tape was cut into a length of 60 mm and a width of 10 mm. From this, an aluminum plate (length: 150 mm, width: 50 mm, thickness of 2 mm, alloy number A1050) with a clean and smooth surface was attached on one surface of the adhesive tape under the conditions of an atmosphere of 23° C. and 50% RH in a state where a part of the adhesive tape having a length of 10 mm and a width of 10 mm was protruded as a gripper. Next, a clean and smooth acrylic plate (length: 150 mm, width: 50 mm, thickness: 2 mm, acrylite L, color tone: colorless, manufactured by Mitsubishi Rayon Co., Ltd.) was attached to a surface on a side opposite to the surface of the adhesive tape to which the aluminum plate was attached, a laminated structure of the aluminum plate, the adhesive tape, and the acrylic plate was pressed by reciprocating and pressurizing with a roller while adding a load of 5 kg thereto, and a piece left for 3 days under the conditions of atmosphere of 23° C. and 50% RH was defined as a test piece.

Under the conditions of an atmosphere of 23° C. and 50% RH, the grip portion of the adhesive tape on the test piece was on the acrylic plate side with respect to the attachment surface of the adhesive tape, a load limiter was set to 15 N by using a TENSILON tensile testing machine (model name: RTF-1210, manufactured by A & D Company, Limited) in 90° direction (vertical direction), and the test piece was elongated at a speed of tensile speed of 1,000 mm/min. At this time, a degree of occurrence of cutting of the adhesive tape and the degree of the adhesive composition remaining on the adherend (at least one of the aluminum plate and the acrylic plate) after the adhesive tape is peeled off was visually checked.

The test by the method was carried out three times, and the re-peeling property (vertical elongation peeling) was evaluated based on the following evaluation criteria.

[Evaluation Criteria]

A: The occurrence of cutting of the adhesive tape was 0 times out of 3 times.

B: The occurrence of cutting of the adhesive tape was 1 time out of 3 times and/or the area of the adhesive composition remaining on the adherend is less than 1/5 with respect to the initial attachment area.

C: The occurrence of cutting of the adhesive tape was 1 time out of 3 times, the adhesive tape was not elongated, and the area of the adhesive tape remaining on the adherend was 4/5 or more with respect to the initial attachment area.

D: The occurrence of cutting of the adhesive tape was 2 times or more out of 3 times and/or the adhesive tape was not elongated, and the re-peeling could not be performed.

A and B indicate that there is no problem in use.

(6) Evaluation of 90° Elongation Peeling (Medium Speed)

In the "evaluation of vertical elongation peeling (high speed)", a tensile speed of the adhesive tape of 1,000 mm/min was changed to a tensile speed of 500 mm/min, and the same test was performed and evaluated.

(7) Evaluation of 90° Elongation Peeling (Low Speed)

In the "evaluation of vertical elongation peeling (high speed)", a tensile speed of the adhesive tape of 1,000 mm/min was changed to a tensile speed of 50 mm/min, and the same test was performed and evaluated.

(8) Evaluation of Drop Impact Resistance

As shown in FIG. 1(a), two adhesive tapes 1 cut into a length of 20 mm and a width of 2 mm were prepared and attached to an aluminum plate 11 (length 50 mm, width 25 mm, thickness 0.8 mm, alloy number A1050) in parallel with each other with an interval of 40 mm therebetween. An acrylic plate 12 (length 50 mm, width 25 mm, thickness 2.5 mm, Acrylite L, color tone: colorless, manufactured by Mitsubishi Rayon Co., Ltd.) was attached to the opposite surface of the adhesive tape 1 while applying a load of 2 kg. The test piece 10 was obtained by pressurizing it with a roller for one reciprocating pressure and crimping it, and then allowing it to stand for 24 hours under the conditions of an atmosphere of 40° C. and 50% RH. Note that FIG. 1(a) is a schematic plan view of the test piece 10 seen from the side of the acrylic plate 12, and although the position of the acrylic plate 12 is displaced for explanation, the outer circumference of the acrylic plate 12 and the outer circumference of the aluminum plate 11 are actually arranged so as to overlap each other in a plan view.

Figure 1B:
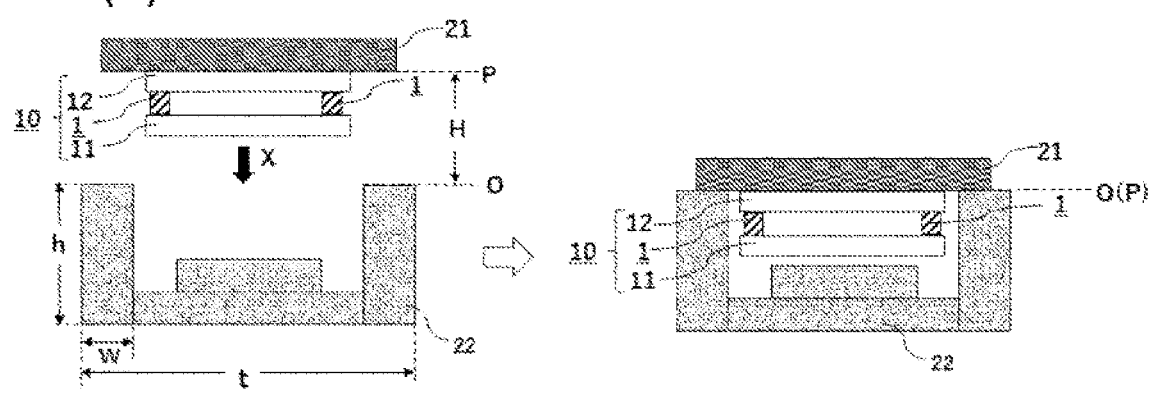

Next, as shown in FIG. 1(b), a U-shaped measurement table 22 (length t: 150 mm, width (no code in the figure): 100 mm, height h: 45 mm, thickness w: 5 mm made of aluminum) was placed on the pedestal of the DuPont impact tester (manufactured by Tester Sangyo Co., Ltd.), and the test piece 10 provided with a 300 g stainless steel load 21 on the acrylic plate 12 side of the test piece 10 was dropped toward the U-shaped measurement table 22 so that the aluminum plate 11 was facing downward under the conditions of an atmosphere of 23° C. and 50% RH. The arrow X in FIG. 1(b) indicates the falling direction of the test piece 10 having the load 21. With the top of the U-shaped measurement table 22 in the height direction as the reference O, the height H from the reference O to the position P of the adhesive surface of the test piece 10 with the load 21 starts from 10 cm and was changed by 10 cm at a time. While changing the height, the test piece 10 was dropped 5 times for each height, and the height H when the adhesive tape 1 was found to be peeled off or broken in the test piece 10 was measured. Assuming a product in which the adhesive tape was attached to the adherend, a 300 g stainless steel load 21 was applied to the acrylic plate 12 side of the test piece 10 for measurement.

(9) Evaluation of Impact Resistance

Figure 2:
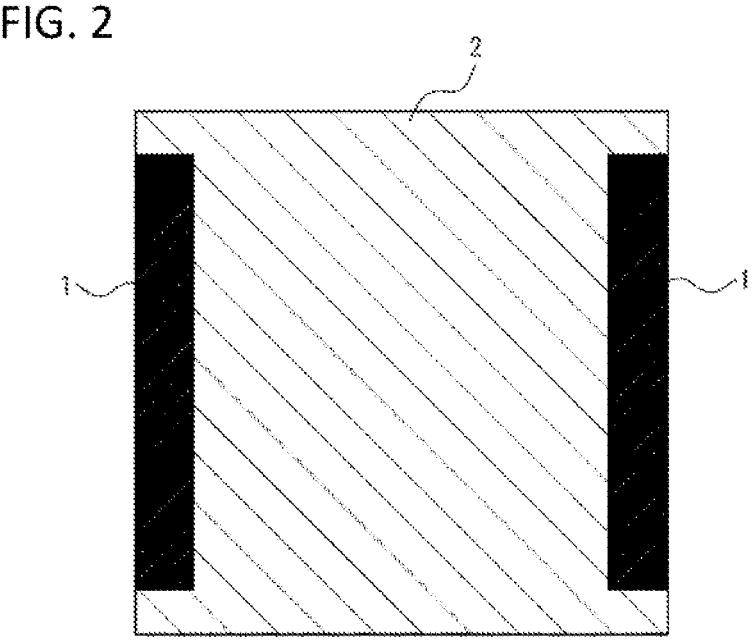
FIG. 2 is a schematic explanatory view of a method for attaching an adhesive tape 1 to an acrylic plate 2 in a case of evaluating impact resistance in an example.
Figure 3:
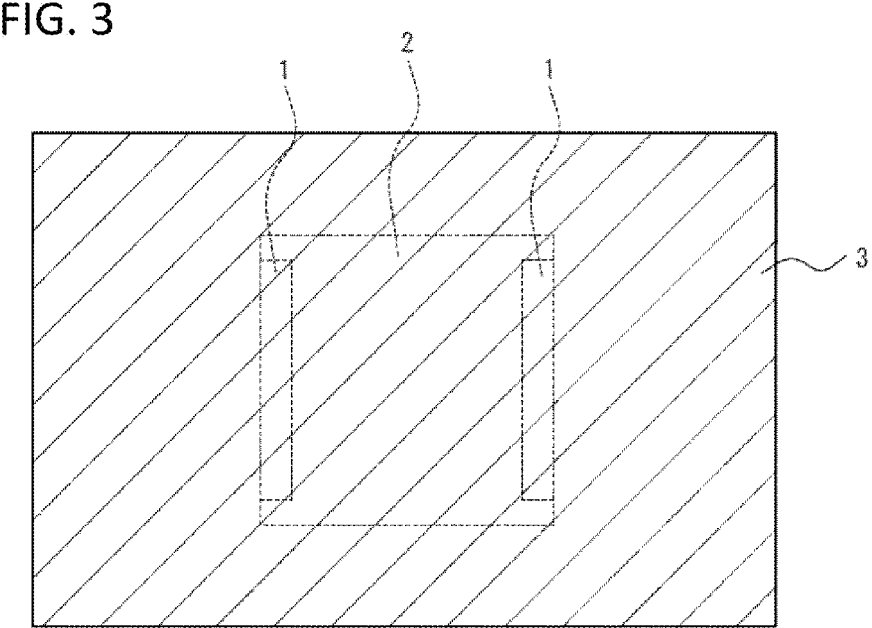
FIG. 3 is a schematic explanatory view of a test piece produced in a case of evaluating impact resistance in an example.

Two sheets of each adhesive tape cut into a length of 20 mm and a width of 5 mm were prepared. As shown in FIG. 2, adhesive tapes 1 were attached to an acrylic plate (length: 50 mm, width: 50 mm, thickness: 2 mm, acrylite L, color tone: colorless, manufactured by Mitsubishi Rayon Co., Ltd.) 2 in parallel with a space of 40 mm therebetween. Next, as shown in FIG. 3, the acrylic plate 2 to which the adhesive tape 1 was attached was attached to a center part of an ABS plate (length: 150 mm, width: 100 mm, thickness: 2 mm, Tough Ace R, manufactured by Sumitomo Bakelite Co., Ltd., hue: natural no grain) 3, a laminated structure of the acrylic plate 2, the adhesive tape 1, and the ABS plate 3 was pressed by reciprocating and pressurizing with a roller while adding a load of 2 kg thereto, and a piece left for 24 hours under the conditions of atmosphere of 40° C. and 50% RH was defined as a test piece.

Figure 4:
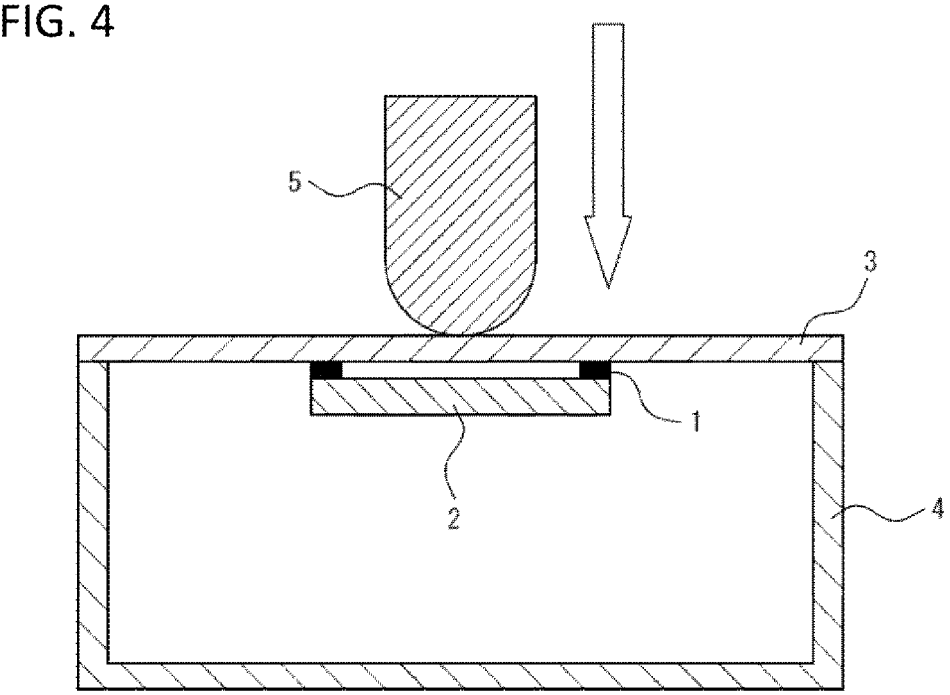
FIG. 4 is a schematic explanatory view of a method for installing a test piece on a U-shaped measurement table in a case of evaluating impact resistance in an example.

As shown in FIG. 4, a U-shaped measurement table (length: 150 mm, width: 100 mm, height: 45 mm, thickness: 5 mm made of aluminum) 4 was installed on a pedestal of the DuPont impact tester (manufactured by Tester Sangyo Co., Ltd.), and the test piece was placed thereon so that the acrylic plate 2 of the test piece was facing downward (FIG. 4). Under the conditions of an atmosphere of 23° C. and 50% RH, a stainless steel striking core (diameter: 25 mm, mass: 300 g) 5 was dropped from the ABS plate 3 side to a central portion of the ABS plate 3. At this time, while changing the height of the striking core 5 from 10 cm by 10 cm, the striking core 5 was dropped 5 times at intervals of 10 seconds for each height, and the height when the peeling or breaking of the adhesive tape on the test piece was observed was measured, and the impact resistance was evaluated based on the following evaluation criteria.

[Evaluation Criteria]

A: When the striking core 5 was dropped from a height of 60 cm or more, the adhesive tape was not peeled off or broken.

B: When the striking core 5 was dropped from a height of 30 cm to 50 cm, the adhesive tape was not peeled off or broken.

C: When the striking core 5 was dropped from a height of 10 cm or more to less than 30 cm, the adhesive tape was peeled off or broken.

D: When the height of the striking core 5 was 10 cm, the adhesive tape was peeled off or broken.

A and B indicate that there is no problem in use.

(10) Evaluation of 180° Peeling Adhesive Strength

The 180° peeling adhesive strength was measured based on JIS Z0237. Specifically, each adhesive tape was cut into a length of 150 mm and a width of 20 mm, and one surface of the adhesive tape was lined with a PET film having a thickness of 25 μm. Next, the other surface of the adhesive tape was attached to a stainless steel plate (length: 100 mm, width: 30 mm, thickness: 3 mm) under the condition of an atmosphere of 23° C. and 50% RH, a laminated structure of the adhesive tape and the stainless steel plate was pressed by reciprocating and pressurizing with a roller while adding a load of 2 kg thereto, and a piece left for 1 hour under the conditions of atmosphere of 23° C. and 50% RH was defined as a test piece.

The adhesive tape on the test piece was elongated using TENSILON tensile testing machine (model name: RTF-1210, manufactured by A & D Company, Limited) in the 180° direction (horizontal direction) under the conditions of an atmosphere of 23° C. and 50% RH, at a speed of a tensile speed of 300 mm/min, and the 180° peeling adhesive strength of the adhesive tape was measured.

Subsequently, the materials and the like used in examples and comparative examples are as follows.

<Materials for Base Material>

—Material for Base Material (1) (SIS)

As material for the base material (1), a mixture of a styrene-isoprene copolymer and a styrene-isoprene-styrene copolymer (hereinafter, may be referred to as "SIS") was used. The mixture has a structural unit of 25% by weight derived from styrene represented by the following Chemical Formula (3), and the ratio of the styrene-isoprene copolymer to the total amount of the resin composition (1) is 17% by weight.

[Chem. 3]

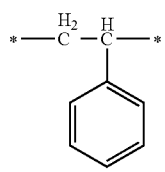

(3)

—Material for base material (2) (SEEPS)

3,000 mL of cyclohexane as a solvent and 9.2 mL of sec-butyllithium (cyclohexane solution) having a concentration of 10.5% by mass as an initiator were put into a pressure-resistant container which was dried and an atmosphere of which was substituted with nitrogen, heated to 60° C., and polymerized for 60 minutes by adding 100 mL of styrene.

After that, 270 mL of isoprene and 350 mL of butadiene were added at the same temperature, and then the reaction was allowed for 90 minutes. Subsequently, 100 mL of styrene was added at the same temperature and polymerized for 60 minutes, and then the polymerization was stopped with 0.52 mL of methanol, thereby obtaining a polymerized reaction solution containing a block copolymer.

29.3 g of palladium carbon (palladium carrying amount: 5% by mass) as a hydrogenation catalyst was added to this reaction mixture, and a hydrogenation reaction was carried out at a hydrogen pressure of 2 MPa and 150° C. for 10 hours. After allowing to cool and pressure discharge, palladium carbon was removed by filtration, the filtrate was concentrated, and further vacuum dried to obtain a material for a base material (2).

The obtained material for a base material (2) was a styrene-ethylene-ethylene/propylene-styrene block copolymer (hereinafter, may be referred to as "SEEPS") having the styrene content of 30% by mass, the weight average molecular weight of 98,000, the molecular weight distribution of 1.03, and the hydrogenation rate of 98%.

<Adhesive Composition>

The adhesive composition in the present invention contains particles and an adhesive resin described below.

<Additional Particles>
Silicone Particles (1)

As the silicone particles (1), particles having a surface made of silicone resin and an inside made of silicone rubber (manufactured by Shin-Etsu Chemical Co., Ltd., KMP-601, volume average particle diameter: 12 μm, particle size distribution ($D_{90}/D_{10}$): 4.4) were used.

Silicone Particles (2)

As the silicone particles (2), particles having a surface made of silicone resin and an inside made of silicone rubber (manufactured by Shin-Etsu Chemical Co., Ltd., KMP-600, volume average particle diameter: 5 μm, particle size distribution ($D_{90}/D_{10}$):3.2) were used.

Silicone Particles (3)

As the silicone particles (3), particles having a surface made of silicone resin and an inside made of silicone rubber (manufactured by Shin-Etsu Chemical Co., Ltd., KMP-602, volume average particle diameter: 30 μm, particle size distribution ($D_{90}/D_{10}$):5.2) were used.

Silicone Particles (4)

As the silicone particles (4), particles having a surface made of silicone resin and an inside made of silicone rubber (manufactured by Shin-Etsu Chemical Co., Ltd., X-52-7030, volume average particle diameter: 0.8 μm, particle size distribution ($D_{90}/D_{10}$):6.0) were used.

Silicone Particles (5)

As the silicone particles (5), particles formed of silicone rubber (particles the surface of which is not a silicone resin) (manufactured by Shin-Etsu Chemical Co., Ltd., KMP-598, volume average particle diameter: 13 μm, particle size distribution ($D_{90}/D_{10}$):4.9) were used.

Silicone Particles (6)

As the silicone particles (6), particles formed of silicone resin (manufactured by Shin-Etsu Chemical Co., Ltd., KMP-701, volume average particle diameter: 3.5 μm, particle size distribution ($D_{90}/D_{10}$):3.4) were used.

Aluminum Hydroxide Particles

Aluminum hydroxide particles (manufactured by Nippon Light Metal Co., Ltd., BW153, volume average particle diameter: 18 μm, particle size distribution ($D_{90}/D_{10}$): 12.3) were used.

Adhesive Resin (1) (Acrylic)

75.94 parts by mass of n-butyl acrylate, 5 parts by mass of 2-ethylhexyl acrylate, 15 parts by mass of cyclohexyl acrylate, 4 parts by mass of acrylate, 0.06 parts by mass of 4-hydroxybutyl acrylate, and 200 parts by mass of ethyl acetate were put into a reaction vessel equipped with a stirrer, a reflux cooling tube, a nitrogen introduction tube, a thermometer, and a dropping funnel, heated to 65° C. while blowing nitrogen under stirring, thereby obtaining a mixture (1). Next, 4 parts by mass (solid content 2.5% by mass) of a 2,2'-azobis isobutyronitrile solution previously dissolved in ethyl acetate was added to the mixture (1), and held at 65° C. for 10 hours under stirring, thereby obtaining a mixture (2). Next, the mixture (2) was diluted with 98 parts by mass of ethyl acetate and filtered through a 200 mesh wire net to obtain an acrylic copolymer solution (1) having the weight average molecular weight of 1,600,000 (converted in terms of polystyrene).

Next, 5 parts by mass of a polymerized rosin ester-based tackifier resin (D-125, Arakawa Chemical Industry Co., Ltd.) and 15 parts by mass of a petroleum-based tackifier resin (FTR (registered trademark) 6125 (manufactured by Mitsui Kagaku Co., Ltd.) were mixed and stirred with respect to 100 parts by mass of the acrylic copolymer solution (1), and then ethyl acetate was added to obtain an adhesive resin solution (1) having the solid content of 35% by mass.

Adhesive Resin (2) (Acrylic)

In a reaction vessel equipped with a stirrer, a reflux cooler, a thermometer, a dropping funnel and a nitrogen gas inlet, 96.4 parts by mass of n-butyl acrylate, 3.5 parts by mass of acrylate, 0.1 parts by mass of 2-hydroxyethyl acrylate, 0.1 part by mass of 2,2'-azobis isobutyronitrile as a polymerization initiator were dissolved in a solvent consisting of 100 parts by mass of ethyl acetate and polymerized at 70° C. for 12 hours to obtain an acrylic copolymer having a weight average molecular weight of 800,000 (polystyrene equivalent). Next, with respect to 100 parts by mass of the acrylic copolymer, 10 parts by mass of Pencel D135 (pentaerythritol ester of polymerized rosin) manufactured by Arakawa Chemical Industries, Ltd. and 10 parts by mass of super ester A100 (glycerin ester of disproportionated rosin) manufactured by Arakawa Chemical Industries, Ltd. were added, ethyl acetate was added, and the mixture was uniformly mixed to obtain an adhesive resin solution (2) having a non-volatile content of 35%.

<Preparation of Adhesive Composition>

Adhesive Composition (1)

30 parts by mass of the silicone particles (1) was added to 100 parts by mass of the solid content of the adhesive resin solution (1). Subsequently, 1.3 parts by mass of a crosslinking agent (Bernock D-40, manufactured by DIC Corporation; trimethylol propan adduct of tolylene diisocyanate, isocyanate group content: 7% by mass, non-volatile content: 40% by mass) was added to a solution containing the silicone particles (1) based on 100 parts by mass of the adhesive resin solution (1), stirred and mixed so as to be uniform, and ethyl acetate was added, to obtain a solution of an adhesive composition (1) having the solid content of 40% by mass.

Adhesive Composition (2)

30 parts by mass of the silicone particles (1) was added to 100 parts by mass of the solid content of the adhesive resin solution (2). Subsequently, 1.1 parts by mass of a crosslinking agent (Bernock D-40, manufactured by DIC Corporation; trimethylol propan adduct of tolylene diisocyanate, isocyanate group content: 7% by mass, non-volatile content: 40% by mass) was added to a solution containing the silicone particles (1) based on 100 parts by mass of the adhesive resin solution (2), stirred and mixed so as to be uniform, and ethyl acetate was added, to obtain a solution of an adhesive composition (2) having the solid content of 40% by mass.

Adhesive Composition (3)

30 parts by mass of the silicone particles (2) was added to 100 parts by mass of the solid content of the adhesive resin solution (1). Subsequently, 1.3 parts by mass of a crosslinking agent (Bernock D-40, manufactured by DIC Corporation; trimethylol propan adduct body of tolylene diisocyanate, isocyanate group content 7% by mass, non-volatile content 40% by mass) was added to the solution containing the silicone particles (2) based on 100 parts by mass of the adhesive resin solution (1), and the mixture was stirred and mixed so as to be uniform, and then ethyl acetate was added to obtain a solution of an adhesive composition (3) having a solid content of 40% by mass.

Adhesive Composition (4)

30 parts by mass of the silicone particles (1) was added to 100 parts by mass of the solid content of the adhesive resin solution (3). Subsequently, 1.3 parts by mass of a crosslinking agent (Bernock D-40, manufactured by DIC Corporation; trimethylol propan adduct body of tolylene diisocyanate, isocyanate group content 7% by mass, non-volatile content 40% by mass) was added to a solution containing the silicone particles (3) based on 100 parts by mass of the adhesive resin solution (1), and the mixture was stirred and mixed so as to be uniform, and then ethyl acetate was added to obtain a solution of an adhesive composition (4) having a solid content of 40% by mass.

Adhesive Composition (5)

1.3 parts by mass of a crosslinking agent (Bernock D-40, manufactured by DIC Corporation; trimethylol propan adduct body of tolylene diisocyanate, isocyanate group content 7% by mass, non-volatile content 40% by mass) was added to 100 parts by mass of the adhesive resin solution (1), and the mixture was stirred and mixed so as to be uniform, and then ethyl acetate was added to obtain a solution of an adhesive composition (5) having a solid content of 40% by mass.

Adhesive Composition (6)

30 parts by mass of the aluminum hydroxide particles was added to 100 parts by mass of the solid content of the adhesive resin solution (1). Subsequently, 1.3 parts by mass of a crosslinking agent (Bernock D-40, manufactured by DIC Corporation; trimethylol propan adduct body of tolylene diisocyanate, isocyanate group content 7% by mass, non-volatile content 40% by mass) was added to a solution containing aluminum hydroxide particles based on 100 parts by mass of the adhesive resin solution (1), and the mixture was stirred and mixed so as to be uniform, and then ethyl acetate was added to obtain a solution of an adhesive composition (6) having a solid content of 40% by mass.

Adhesive Composition (7)

60 parts by mass of the silicone particles (1) was added to 100 parts by mass of the solid content of the adhesive resin solution (1). Subsequently, 1.3 parts by mass of a crosslinking agent (Bernock D-40, manufactured by DIC Corporation; trimethylol propan adduct body of tolylene diisocyanate, isocyanate group content 7% by mass, non-volatile content 40% by mass) was added to the solution containing the silicone particles (1) based on 100 parts by mass of the adhesive resin solution (1), and the mixture was stirred and mixed so as to be uniform, and then ethyl acetate was added to obtain a solution of an adhesive composition (7) having a solid content of 40% by mass.

Adhesive Composition (8)

30 parts by mass of the silicone particles (4) was added to 100 parts by mass of the solid content of the adhesive resin solution (1). Subsequently, 1.3 parts by mass of a crosslinking agent (Bernock D-40, manufactured by DIC Corporation; trimethylol propan adduct body of tolylene diisocyanate, isocyanate group content 7% by mass, non-volatile content 40% by mass) was added to a solution containing the silicone particles (4) based on 100 parts by mass of the adhesive resin solution (1), and the mixture was stirred and mixed so as to be uniform, and then ethyl acetate was added to obtain a solution of an adhesive composition (8) having a solid content of 40% by mass.

Adhesive Composition (9)

30 parts by mass of the silicone particles (5) was added to 100 parts by mass of the solid content of the adhesive resin solution (1). Subsequently, 1.3 parts by mass of a crosslinking agent (Bernock D-40, manufactured by DIC Corporation; trimethylol propan adduct body of tolylene diisocyanate, isocyanate group content 7% by mass, non-volatile content 40% by mass) was added to a solution containing the silicone particles (5) based on 100 parts by mass of the adhesive resin solution (1), and the mixture was stirred and mixed so as to be uniform, and then ethyl acetate was added to obtain a solution of an adhesive composition (9) having a solid content of 40% by mass.

Adhesive Composition (10)

30 parts by mass of the silicone particles (6) was added to 100 parts by mass of the solid content of the adhesive resin solution (1). Subsequently, 1.3 parts by mass of a crosslinking agent (Bernock D-40, manufactured by DIC Corporation; trimethylol propan adduct body of tolylene diisocyanate, isocyanate group content 7% by mass, non-volatile content 40% by mass) was added to a solution containing the silicone particles (6) based on 100 parts by mass of the adhesive resin solution (1), and the mixture was stirred and mixed so as to be uniform, and then ethyl acetate was added to obtain a solution of an adhesive composition (10) having a solid content of 40% by mass.

Adhesive Composition (11)

2 parts by mass of the silicone particles (6) was added to 100 parts by mass of the solid content of the adhesive resin solution (1). Subsequently, 1.3 parts by mass of a crosslinking agent (Bernock D-40, manufactured by DIC Corporation; trimethylol propan adduct body of tolylene diisocyanate, isocyanate group content 7% by mass, non-volatile content 40% by mass) was added to a solution containing the silicone particles (6) based on 100 parts by mass of the adhesive resin solution (1), and the mixture was stirred and mixed so as to be uniform, and then ethyl acetate was added to obtain a solution of an adhesive composition (11) having a solid content of 40% by mass.

Adhesive Composition (12)

45 parts by mass of the silicone particles (1) was added to 100 parts by mass of the solid content of the adhesive resin solution (1). Subsequently, 1.3 parts by mass of a crosslinking agent (Bernock D-40, manufactured by DIC Corporation; trimethylol propan adduct body of tolylene diisocyanate, isocyanate group content 7% by mass, non-volatile content 40% by mass) was added to the solution containing the silicone particles (1) based on 100 parts by mass of the adhesive resin solution (1), and the mixture was stirred and mixed so as to be uniform, and then ethyl acetate was added to obtain a solution of an adhesive composition (12) having a solid content of 40% by mass.

Adhesive Composition (13)

25 parts by mass of the silicone particles (1) was added to 100 parts by mass of the solid content of the adhesive resin solution (1). Subsequently, 1.3 parts by mass of a crosslinking agent (Bernock D-40, manufactured by DIC Corporation; trimethylol propan adduct body of tolylene diisocyanate, isocyanate group content 7% by mass, non-volatile content 40% by mass) was added to the solution containing the silicone particles (1) based on 100 parts by mass of the adhesive resin solution (1), and the mixture was stirred and mixed so as to be uniform, and then ethyl acetate was added to obtain a solution of an adhesive composition (13) having a solid content of 40% by mass.

Adhesive Composition (14)

2 parts by mass of the silicone particles (1) was added to 100 parts by mass of the solid content of the adhesive resin solution (1). Subsequently, 1.3 parts by mass of a crosslinking agent (Bernock D-40, manufactured by DIC Corporation; trimethylol propan adduct body of tolylene diisocyanate, isocyanate group content 7% by mass, non-volatile content 40% by mass) was added to the solution containing the silicone particles (1) based on 100 parts by mass of the adhesive resin solution (1), and the mixture was stirred and mixed so as to be uniform, and then ethyl acetate was added to obtain a solution of an adhesive composition (14) having a solid content of 40% by mass.

Subsequently, the examples and comparative examples will be described.

Example 1

The solution of the adhesive composition (1) was applied on a release liner (film binar 75E-0010GT, manufactured by Fujimori Kogyo Co., Ltd., the same applies hereinafter) with an applicator so that the thickness after drying becomes 50 µm, and dried at 80° C. for 3 minutes to obtain an adhesive layer.

Next, a toluene solution was added to the material for a base material (1) and stirred so as to be uniform and was applied on a release liner with an applicator so that the thickness after drying becomes 100 µm, and dried at 60° C. for 5 minutes to produce a base material layer.

After the release liner of the base material layer is peeled off, the adhesive layer from which the release liner was peeled off was attached to both surfaces of the base material layer, and a laminated structure of the base material layer and the adhesive layer was pressed at 0.2 MPa and laminated to produce an adhesive tape (1).

The obtained adhesive tape was evaluated by the method, and the results thereof are shown in Table 1.

Example 2

An adhesive tape (2) was produced by the same method as in Example 1, except that the material for a base material (1) was changed to material for a base material (2), in the production of the adhesive tape (1) of Example 1.

The obtained adhesive tape was evaluated by the method, and the results thereof are shown in Table 1.

Example 3

An adhesive tape (3) was produced by the same method as in Example 1, except that the adhesive composition (1) was changed to adhesive composition (2), in the production of the adhesive tape (1) of Example 1.

The obtained adhesive tape was evaluated by the method, and the results thereof are shown in Table 1.

Example 4

An adhesive tape (4) was produced by the same method as in Example 1, except that the adhesive composition (1) was changed to adhesive composition (3), in the production of the adhesive tape (1) of Example 1.

The obtained adhesive tape was evaluated by the method, and the results thereof are shown in Table 1.

Example 5

An adhesive tape (5) was produced by the same method as in Example 1, except that the thickness of the base material layer was changed to 400 µm, in the production of the adhesive tape (1) of Example 1.

The obtained adhesive tape was evaluated by the method, and the results thereof are shown in Table 1.

Example 6

An adhesive tape (6) was produced by the same method as in Example 1, except that the adhesive composition (1) was changed to adhesive composition (4), in the production of the adhesive tape (1) of Example 1.

The obtained adhesive tape was evaluated by the method, and the results thereof are shown in Table 1.

Example 7

An adhesive tape (7) was produced by the same method as in Example 1, except that a commercially available polyethylene terephthalate (PET) film (S-10 manufactured by Toray Industries, Inc., thickness 50 µm) was used as a base material layer in the production of the adhesive tape (1) of Example 1.

The obtained adhesive tape was evaluated by the method, and the results thereof are shown in Table 1. The thickness, breaking strength, breaking elongation and rubber hardness of the PET film were measured by the above methods.

Example 8

The adhesive composition (1) is applied onto a release liner with an applicator so that the thickness after drying is 100 µm, and dried at 80° C. for 3 minutes to prepare an adhesive layer to produce the adhesive tape (8). The adhesive tape (8) is a specification that does not have a base material layer.

The obtained adhesive tape was evaluated by the method, and the results thereof are shown in Table 1.

Example 9

An adhesive tape (9) was produced by the same method as in Example 1, except that the thickness of the base material layer was changed to 700 µm, in the production of the adhesive tape (1) of Example 1.

The obtained adhesive tape was evaluated by the method, and the results thereof are shown in Table 1.

Example 10

An adhesive tape (10) was produced by the same method as in Example 1, except that the adhesive composition (1) was changed to adhesive composition (12), in the production of the adhesive tape (1) of Example 1.

The obtained adhesive tape was evaluated by the method, and the results thereof are shown in Table 1.

Example 11

An adhesive tape (11) was produced by the same method as in Example 1, except that the adhesive composition (1) was changed to adhesive composition (13), in the production of the adhesive tape (1) of Example 1.

The obtained adhesive tape was evaluated by the method, and the results thereof are shown in Table 1.

Comparative Example 1

An adhesive tape (12) was produced by the same method as in Example 1, except that the adhesive composition (1) was changed to adhesive composition (5), in the production of the adhesive tape (1) of Example 1.

The obtained adhesive tape was evaluated by the method, and the results thereof are shown in Table 2.

Comparative Example 2

An adhesive tape (13) was produced by the same method as in Example 1, except that the adhesive composition (1)

was changed to adhesive composition (6), in the production of the adhesive tape (1) of Example 1.

The obtained adhesive tape was evaluated by the method, and the results thereof are shown in Table 2.

Comparative Example 3

An adhesive tape (14) was produced by the same method as in Example 1, except that the adhesive composition (1) was changed to adhesive composition (7), in the production of the adhesive tape (1) of Example 1.

The obtained adhesive tape was evaluated by the method, and the results thereof are shown in Table 2.

Comparative Example 4

An adhesive tape (15) was produced by the same method as in Example 1, except that the adhesive composition (1) was changed to adhesive composition (8), in the production of the adhesive tape (1) of Example 1.

The obtained adhesive tape was evaluated by the method, and the results thereof are shown in Table 2.

Comparative Example 5

An adhesive tape (16) was produced by the same method as in Example 1, except that the adhesive composition (1) was changed to adhesive composition (9), in the production of the adhesive tape (1) of Example 1.

The obtained adhesive tape was evaluated by the method, and the results thereof are shown in Table 2.

Comparative Example 6

An adhesive tape (17) was produced by the same method as in Example 1, except that the adhesive composition (1) was changed to adhesive composition (10), in the production of the adhesive tape (1) of Example 1.

The obtained adhesive tape was evaluated by the method, and the results thereof are shown in Table 2.

Comparative Example 7

An adhesive tape (18) was produced by the same method as in Example 1, except that the adhesive composition (1) was changed to adhesive composition (11), in the production of the adhesive tape (1) of Example 1.

The obtained adhesive tape was evaluated by the method, and the results thereof are shown in Table 2.

Comparative Example 8

An adhesive tape (19) was produced by the same method as in Example 1, except that the adhesive composition (1) was changed to adhesive composition (14), in the production of the adhesive tape (1) of Example 1.

The obtained adhesive tape was evaluated by the method, and the results thereof are shown in Table 2.

Comparative Example 9

An adhesive tape (20) was produced by the same method as in Example 8, except that the adhesive composition (1) was changed to adhesive composition (5), in the production of the adhesive tape (8) of Example 8. The adhesive tape (20) is a specification that does not have a base material layer.

The obtained adhesive tape was evaluated by the method, and the results thereof are shown in Table 2.

TABLE 1

| | | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Base material layer | Kind | — | Material for base material 1 (SIS) | Material for base material 2 (SEEPS) | Material for base material 1 (SIS) | Material for base material 1 (SIS) | Material for base material 1 (SIS) | Material for base material 1 (SIS) | PET | None | Material for base material 1 (SIS) | Material for base material 1 (SIS) | Material for base material 1 (SIS) |
| | Thickness | μm | 100 | 100 | 100 | 100 | 100 | 100 | 50 | — | 100 | 100 | 100 |
| | Breaking strength | MPa | 25 | 85 | 25 | 25 | 25 | 25 | 150 | — | 25 | 25 | 25 |
| | Breaking elongation | % | 1100 | 775 | 1100 | 1100 | 1100 | 1100 | 115 | — | 700 | 1100 | 1100 |
| | Rubber hardness | A | 55 | 75 | 55 | 55 | 55 | 55 | 98 | — | 55 | 55 | 55 |
| Adhesive layer | Thickness | μm | 50 | 50 | 50 | 50 | 50 | 50 | 50 | 100 | 50 | 50 | 50 |
| | Adhesive composition | — | Adhesive composition 1 | Adhesive composition 1 | Adhesive composition 2 | Adhesive composition 3 | Adhesive composition 1 | Adhesive composition 4 | Adhesive composition 1 | Adhesive composition 1 | Adhesive composition 1 | Adhesive composition 12 | Adhesive composition 13 |
| | Kind | — | Adhesive resin 1 (acryl) | Adhesive resin 1 (acryl) | Adhesive resin 2 (acryl) | Adhesive resin 1 (acryl) | Adhesive resin 1 (acryl) | Adhesive resin 1 (acryl) | Adhesive resin 1 (acryl) | Adhesive resin 1 (acryl) | Adhesive resin 1 (acryl) | Adhesive resin 1 (acryl) | Adhesive resin 1 (acryl) |
| | Additive particles | Kind | — | Silicone particles 1 | Silicone particles 1 | Silicone particles 1 | Silicone particles 2 | Silicone particles 1 | Silicone particles 3 | Silicone particles 1 | Silicone particles 1 | Silicone particles 1 | Silicone particles 1 | Silicone particles 1 |
| | | Particle diameter | μm | 12 | 12 | 12 | 5 | 12 | 30 | 12 | 12 | 12 | 12 | 12 |
| | | Content | Parts by mass | 30 | 30 | 30 | 30 | 30 | 30 | 30 | 30 | 30 | 45 | 25 |
| 90° elongation peeling (high speed) | | — | B | A | B | B | D | A | D | D | D | B | B |
| 90° elongation peeling (middle speed) | | — | A | A | A | A | B | A | D | D | D | A | A |
| 90° elongation peeling (low speed) | | — | A | A | A | A | A | A | D | D | D | A | A |
| Impact resistance | | — | A | B | A | A | A | B | D | A | D | A | A |
| Drop impact resistance | | cm | >100 | 70 | >100 | 100 | >100 | >100 | 70 | >100 | >100 | >100 | >100 |
| Adhesive strength | | N/20 mm | 23 | 22 | 22 | 28 | 24 | 20 | 21 | 21 | 23 | 21 | 23 |

TABLE 2

| | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| Base material layer | Kind | — | Material for base material 1 (SIS) | Material for base material 1 (SIS) | Material for base material 1 (SIS) | Material for base material 1 (SIS) | Material for base material 1 (SIS) | Material for base material 1 (SIS) | Material for base material 1 (SIS) | Material for base material 1 (SIS) | None |
| | Thickness | μm | 100 | 100 | 100 | 100 | 100 | 100 | 100 | 100 | — |
| | Breaking strength | MPa | 25 | 25 | 25 | 25 | 25 | 25 | 25 | 25 | — |
| | Breaking elongation | % | 1100 | 1100 | 1100 | 1100 | 1100 | 1100 | 1100 | 1100 | — |
| | Rubber hardness | A | 55 | 55 | 55 | 55 | 55 | 55 | 55 | 55 | — |
| Adhesive layer | Thickness | μm | 50 | 50 | 50 | 50 | 50 | 50 | 50 | 50 | 100 |
| | Adhesive composition | | Adhesive composition 5 | Adhesive composition 6 | Adhesive composition 7 | Adhesive composition 8 | Adhesive composition 9 | Adhesive composition 10 | Adhesive composition 11 | Adhesive composition 14 | Adhesive composition 5 |
| | Kind | — | Adhesive resin 1 (acryl) | Adhesive resin 1 (acryl) | Adhesive resin 1 (acryl) | Adhesive resin 1 (acryl) | Adhesive resin 1 (acryl) | Adhesive resin 1 (acryl) | Adhesive resin 1 (acryl) | Adhesive resin 1 (acryl) | Adhesive resin 1 (acryl) |
| | Additive particles | | | | | | | | | | |
| | Kind | — | — | Aluminum hydroxide particle | Silicone particles 1 | Silicone particles 4 | Silicone particles 5 | Silicone particles 6 | Silicone particles 6 | Silicone particles 1 | — |
| | Particle diameter | μm | — | 18 | 12 | 0.8 | 13 | 3.5 | 3.5 | 12 | — |
| | Content | Parts by mass | — | 30 | 60 | 30 | 30 | 30 | 2 | 2 | — |
| 90° elongation peeling (high speed) | | — | D | D | A | D | D | D | D | D | D |
| 90° elongation peeling (middle speed) | | — | D | D | A | D | D | D | D | D | D |
| 90° elongation peeling (low speed) | | — | D | B | A | D | B | B | D | D | D |
| Impact resistance | | — | A | B | D | A | B | B | A | A | A |
| Drop impact resistance | | cm | 40 | 40 | 30 | 50 | 50 | 40 | 40 | 40 | 40 |
| Adhesive strength | | N/20 mm | 28 | 20 | 16 | 26 | 20 | 24 | 28 | 24 | 27 |

Since the adhesive tapes of Examples 1 to 11 have a specific adhesive layer, they are excellent in drop resistance as compared with Comparative Examples 1 to 9 having no specific adhesive layer. In addition, among Examples 1 to 11, the adhesive tapes of Examples 1 to 6 and 10 to 11 have the specific adhesive layer and the specific base material layer, and thus it was excellent in drop resistance and elongation peeling property as compared with the adhesive tapes of Examples 7 to 9 which do not have the specific base material layer.

INDUSTRIAL APPLICABILITY

The present invention can provide an adhesive tape having excellent drop impact resistance by having a predetermined adhesive layer. In addition, according to the present invention, there is provided an adhesive tape having a specific adhesive layer and a specific base material layer, which is excellent in drop impact resistance and can be more easily and more rapidly removed from an adherend.

The invention claimed is:
1. An adhesive tape comprising:
an adhesive layer comprising particles and an adhesive resin,
wherein the particles have a core-shell structure comprising a core and a shell in which the core is formed of a rubber material and the shell covering each of the cores is formed of a silicone resin,
wherein particles have an average particle diameter of 5 to 30 μm
wherein the particles are included at a content of 3 to 50 parts by mass with respect to 100 parts by mass of the adhesive resin, and
wherein the adhesive resin is of one selected from the group consisting of an acrylic-based adhesive resin, a rubber-based adhesive resin, and a urethane-based adhesive resin.

2. The adhesive tape according to claim 1,
wherein, in a case where particle diameters of particles corresponding to cumulative percentages of 10% and 90% in a cumulative particle size distribution of the particles are defined as D10 and D90, respectively, a ratio of the particle diameter D90 to the particle diameter D10 (D90/D10) is 2.5 to 20.

3. The adhesive tape according to any one of claim 1, further comprising a base material layer, wherein the adhesive layer is provided on one side or both sides of the base material layer.

4. The adhesive tape according to claim 3, wherein the base material layer has a thickness of 10 to 500 μm, a breaking strength of 10 to 90 MPa, and a breaking elongation of 400% to 1,500%.

5. The adhesive tape according to claim 3, wherein the base material layer has a rubber hardness of 20 to 90 A.

6. The adhesive tape according to claim 1, wherein the adhesive layer comprises an acrylic copolymer.

7. The adhesive tape according to claim 1, wherein the adhesive resin is the acrylic-based adhesive resin or the rubber-based adhesive resin.

8. The adhesive tape according to claim 1, wherein the adhesive tape does not include a base material layer.

9. The adhesive tape according to claim 1, wherein when the adhesive tape is subject to a drop impact resistance test, a height is 60 cm or more,
wherein the drop impact resistance test is carried out by the steps comprising:
preparing a test piece by the steps comprising:
providing two pieces of the adhesive tape, each of the piece having a size of a length of 20 mm and a width of 2 mm, each piece having a first surface and a second surface,
attaching the first surface of each of the two pieces to an aluminum plate in parallel with each other with an interval of 40 mm between the two pieces;
attaching an acrylic plate to the second surface of the two pieces;
applying a load of 2 kg to the adhesive tape with a roller for one reciprocating pressure; and
leaving the adhesive tape to stand for 24 hours under a condition of an atmosphere of 40° C. and 50% RH, thereby obtaining the test piece;
providing a U-shaped measurement table on a pedestal of an impact tester;
providing the acrylic plate of the test piece with a 300 g stainless steel load;
dropping the test piece toward the U-shaped measurement table five times in various heights in a condition that the aluminum plate faces below at an atmosphere of 23° C. and 50% RH;
measuring the height when the adhesive tape of the test piece is peeled off or broken, wherein the height is a length from a highest point of the U-shaped measurement table to a contact surface between the test piece and the 300 g stainless steel load.

10. The adhesive tape according to claim 1, wherein the rubber material of the core is a silicone rubber.

11. The adhesive tape according to claim 1, wherein the particles are included at a content of 3 to 45 parts by mass with respect to 100 parts by mass of the adhesive resin.

12. The adhesive tape according to claim 1, wherein the adhesive resin is the acrylic-based adhesive resin comprising an acrylic polymer.

13. The adhesive tape according to claim 1, wherein the adhesive resin is the acrylic-based adhesive resin comprising an acrylic polymer and tackifier,
Wherein the tackifier is included at 5 parts by mass to 65 parts by mass with respect to 100 parts by mass of the acrylic polymer.

14. The adhesive tape according to claim 1, wherein the adhesive resin is a rubber-based adhesive resin, and wherein the rubber-based adhesive resin is a styrene-base resin comprising a styrene-based polymer.

15. The adhesive tape according to claim 1, wherein the adhesive resin is a rubber-based adhesive resin, and wherein the rubber-based adhesive resin is a styrene-based adhesive resin comprising a block copolymer of an aromatic vinyl compound and a conjugated diene compound.

16. An article comprising the adhesive tape according to claim 1.

17. An article having the adhesive tape according to claim 1, comprising:
a first adherend;
a second adherent; and
the adhesive tape between the first adherend and the second adherent, the adhesive tape attaching to the first adherend and the second adherent.

18. A method for peeling off the adhesive tape according to claim 1, comprising:
providing the adhesive tape attached to a first adherend, a part of the adhesive tape protruded from the adherend as a gripper; and
pulling the gripper in a direction at an angle with respect to the adherend.

19. The method for peeling off the adhesive tape according to claim 18, wherein the adhesive tape is further attached to a second adherend such that the adhesive tape is between the first adherend and the second adherend.

* * * * *